United States Patent
Shimada et al.

(10) Patent No.: US 12,412,063 B2
(45) Date of Patent: Sep. 9, 2025

(54) RFID TAG, BLOOD COLLECTION TUBE, AND ANTENNA

(71) Applicant: DAIO PAPER CORPORATION, Ehime (JP)

(72) Inventors: Takuro Shimada, Kagawa (JP); Alina Khan, Ehime (JP); Taro Ikawa, Ehime (JP)

(73) Assignee: DAIO PAPER CORPORATION, Ehime (JP)

( * ) Notice: Subject to any disclaimer, the term of this patent is extended or adjusted under 35 U.S.C. 154(b) by 259 days.

(21) Appl. No.: 18/252,939

(22) PCT Filed: Nov. 25, 2021

(86) PCT No.: PCT/JP2021/043274
§ 371 (c)(1),
(2) Date: May 15, 2023

(87) PCT Pub. No.: WO2022/114084
PCT Pub. Date: Jun. 2, 2022

(65) Prior Publication Data
US 2024/0095486 A1 Mar. 21, 2024

(30) Foreign Application Priority Data

Nov. 27, 2020 (JP) ................. 2020-197057

(51) Int. Cl.
*G06K 19/07* (2006.01)
*G01N 35/00* (2006.01)
(Continued)

(52) U.S. Cl.
CPC . *G06K 19/07758* (2013.01); *G01N 35/00732* (2013.01); *G06K 19/07773* (2013.01);
(Continued)

(58) Field of Classification Search
CPC ....... C07D 209/14; C07D 403/06; C07F 9/06; C07F 9/12; C07F 9/58; C07F 9/65031;
(Continued)

(56) References Cited

U.S. PATENT DOCUMENTS 6,456,228 B1 9/2002 Granhed et al.
8,220,717 B2 * 7/2012 Tasaki .................. A61D 19/024
340/572.1

(Continued)

FOREIGN PATENT DOCUMENTS

CN 108602065 9/2018
JP 2007-019905 1/2007
(Continued)

OTHER PUBLICATIONS

International Search Report for PCT/JP2021/043274 mailed on Feb. 15, 2022.
(Continued)

*Primary Examiner* — Thien M Le
(74) *Attorney, Agent, or Firm* — IPUSA, PLLC

(57) ABSTRACT

The present invention provides an RFID tag to be applied to a container for holding liquid. To achieve a good communication distance regardless of the presence or absence of liquid, the RFID is applied to a container for holding liquid, and includes an IC chip on which identification information is recorded, and an antenna made of a loop-shaped conductor connected to the IC chip, and the antenna has a T-shaped opening in which the conductor is not formed.

8 Claims, 19 Drawing Sheets

(51) Int. Cl.
*G06K 19/077* (2006.01)
*H01Q 1/22* (2006.01)
*H01Q 1/38* (2006.01)

(52) U.S. Cl.
CPC ............ *H01Q 1/2283* (2013.01); *H01Q 1/38* (2013.01); *G01N 2035/00742* (2013.01)

(58) Field of Classification Search
CPC ............ C07F 9/6518; C07F 9/65335; C07F 9/65583; C07F 9/6561; C07H 15/203; C07H 15/207; C07H 15/26; C07H 17/02; C12Q 1/42; G01N 33/581; G06K 10/07; G06K 19/077
See application file for complete search history.

(56) References Cited

U.S. PATENT DOCUMENTS

| | | | | |
|---|---|---|---|---|
| 10,461,397 | B2* | 10/2019 | Augustine | G06K 19/07722 |
| 11,694,044 | B2* | 7/2023 | Arsenault | E21F 17/18 |
| | | | | 340/13.26 |
| 2006/0024757 | A1* | 2/2006 | Hussa | G01N 33/57476 |
| | | | | 800/21 |
| 2007/0008134 | A1 | 1/2007 | Kai | |
| 2007/0279313 | A1 | 12/2007 | Kai et al. | |
| 2008/0258875 | A1 | 10/2008 | Jesme et al. | |
| 2010/0032486 | A1* | 2/2010 | Tasaki | A61D 19/024 |
| | | | | 235/492 |
| 2010/0221477 | A1 | 9/2010 | Bauer et al. | |
| 2013/0214040 | A1* | 8/2013 | Beerling | G01D 18/00 |
| | | | | 235/375 |
| 2014/0266628 | A1* | 9/2014 | Kawasaki | H01Q 1/2216 |
| | | | | 340/10.1 |
| 2015/0210951 | A1* | 7/2015 | Aizenberg | B05D 5/08 |
| | | | | 141/1 |
| 2016/0281133 | A1* | 9/2016 | Wyrich | C12Q 1/6806 |
| 2020/0149098 | A1* | 5/2020 | Green | C12Q 1/6806 |
| 2024/0252154 | A1* | 8/2024 | Vermeulen | A61B 10/0045 |

FOREIGN PATENT DOCUMENTS

| | | |
|---|---|---|
| JP | 2010-525465 | 7/2010 |
| TW | 200805164 | 1/2008 |
| WO | 2006/077645 | 7/2006 |
| WO | 2007/077996 | 7/2007 |
| WO | 2017/109153 | 6/2017 |

OTHER PUBLICATIONS

Choo Jaeyul et al: "UHF RFID Tag Applicable to Various Objects", IEEE Transactions on Antennas and Propagation, IEEE, USA, vol. 62, No. 2, Feb. 1, 2014 (Feb. 1, 2014), pp. 922-925, XP011538772, ISSN: 0018-926X, Doi: 10.1109/TAP.2013.2290051 [retrieved on Jan. 30, 2014] * the whole document*.

Office Action dated Sep. 30, 2024 issued with respect to the corresponding Taiwanese Patent Application No. 110144077.

* cited by examiner (A)

(B)

(A)

(B)

(A)

(B)

(A) WHEN BLOOD COLLECTION TUBE IS EMPTY (B) WHEN BLOOD COLLECTION TUBE HOLDS WATER

RFID TAG, BLOOD COLLECTION TUBE, AND ANTENNA

TECHNICAL FIELD

The present invention relates to an RFID (Radio Frequency Identification) tag, a blood collection tube, and an antenna.

BACKGROUND ART

RFID labels to be applied to objects are popular in logistics management, product management, and in other fields. An RFID label is a label with an RFID tag. An RFID tag includes an IC chip and an antenna that is electrically connected to the IC chip. An RFID tag may be also referred to as a "wireless tag," an "IC tag," an "RF-ID tag," an "RF tag," and the like.

Also, as for the antenna for RFID tags, there is an antenna formed with a power-feeding terminal to which an IC chip is connected, and a bypass conducting path that bypasses the loop of a loop antenna (see, for example, Patent Documents 1 and 2).

RELATED-ART DOCUMENTS

Patent Documents

Patent Document 1: Japanese Unexamined Patent Application Publication No. 2007-19905
Patent Document 2: International Publication No. WO2006/077645

SUMMARY OF THE INVENTION

Problem to be Solved by the Invention

Patent Documents 1 and 2 disclose that a good communication distance can be achieved in a frequency band in which an RFID tag communicates wirelessly, by making a capacitance component inside an IC chip and an inductance component of a bypass conducting path provided in an antenna resonate.

However, with RFID tags to be applied to containers for holding liquid, such as blood collection tubes used for blood tests, there is a problem that the impedance characteristics of the antenna change when the container holds liquid, and the communication distance is shortened.

One embodiment of the present invention has been made in view of the above, and provides an RFID tag that is applied to a container for holding liquid, and that can achieve a good communication distance regardless of the presence or absence of liquid.

Means to Solve the Problem

In order to solve the above problem, one embodiment of the present invention provides an RFID tag to be applied to a container for holding liquid, the RFID tag including: an IC chip on which identification information is recorded; and an antenna made of a loop-shaped conductor connected to the IC chip, and, in this RFID tag, the antenna has a T-shaped opening in which the conductor is not formed.

Effects of the Invention

According to one embodiment of the present invention, it is possible to provide an RFID tag that is applied to a container for holding liquid and that achieves a good communication distance regardless of the presence or absence of liquid.

MODE FOR CARRYING OUT THE INVENTION

Figure 1:
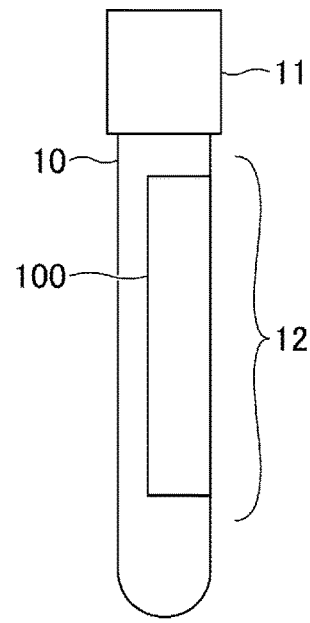
FIG. 1 is a diagram that illustrates an example appearance of a blood collection tube to which an RFID tag according to one embodiment is applied.

Now, an embodiment of the present invention will be described in detail with reference to the accompanying drawings. In the description below, parts that are the same in each drawing may be assigned the same reference numerals, and their description may be omitted. Also, for ease of understanding, the scale of each member in each drawing may differ from the actual scale. Note that, in each example illustrated, directions that are referred to by words such as "parallel," "orthogonal," "horizontal," "vertical," "up," "down," "left," "right," and so forth may tolerate minor deviation insofar as such deviation does not mitigate the effects of the present invention. Also, the X-axis direction, the Y-axis direction, and the Z-axis direction include directions that are parallel to the X-axis, directions that are parallel to the Y-axis, and directions that are parallel to the Z-axis. The X-axis direction, the Y-axis direction, and the Z-axis direction are orthogonal to each other. The XY plane, the YZ plane, and the ZX plane include virtual planes that are parallel to the X-axis direction and the Y-axis direction, virtual planes that are parallel to the Y-axis direction and the Z-axis direction, and virtual planes that are parallel to the Z-axis direction and the X-axis direction, respectively. Of the directions than run along the X axis, the direction indicated by the arrow is the plus X-axis direction, and the opposite direction is the minus X-axis direction. Of the directions that run along the Y axis, the direction indicated by the arrow is the positive Y-axis direction, and the opposite direction is the negative Y-axis direction. Of the directions that run along the Z axis, the direction indicated by the arrow is the positive Z-axis direction, and the opposite direction is the negative Z-axis direction.

<Appearance of Blood Collection Tube>

FIG. 1 is a diagram that illustrates an example appearance of a blood collection tube to which an RFID tag according to one embodiment is applied. The example of FIG. 1 shows the appearance of a blood collection tube 10, which is an example of a container for holding liquid. An RFID tag 100 is applied to the blood collection tube 10 in a predetermined application range 12 on the outer periphery. Preferably, a cap 11 is provided at the tip of the blood collection tube 10.

The blood collection tube 10 is made of plastic such as polyethylene terephthalate. However, the blood collection tube 10 is by no means limited to this, and may be made of other materials such as glass.

Note that the blood collection tube 10 is an example of a container for holding liquid, and a container other than the blood collection tube 10, such as a test tube, a urine collection tube, or an ampoule, may be used as well. Also, blood is an example of liquid that the container holds, and liquids other than blood such as urine, beverage, medicine, and water, may be used as well. Here, an example will be described below assuming that the blood collection tube 10 is the container for holding liquid.

<Structure of RFID Tag>

Figure 2:
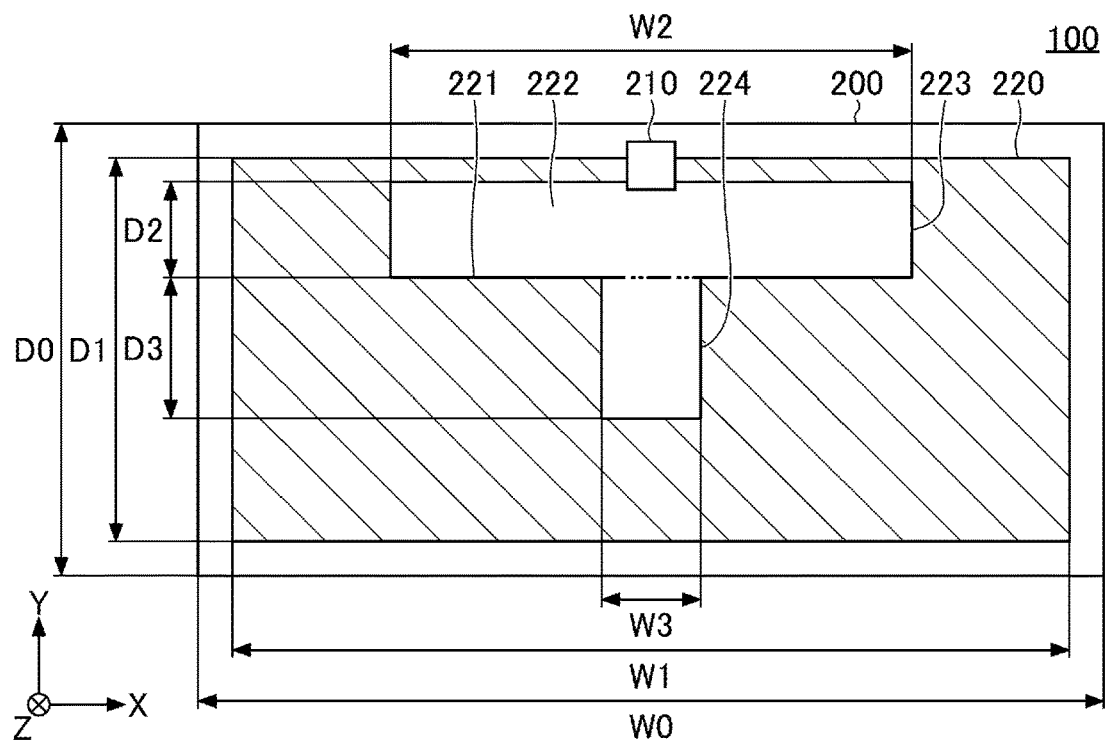
FIG. 2 is a diagram that illustrates an example structure of an RFID tag antenna according to one embodiment.

FIG. 2 is a diagram that illustrates an example structure of an RFID tag according to one embodiment. The RFID tag 100 includes, for example, a band-like sheet 200, an IC chip 210 on which identification information is recorded, an antenna 220 made of a loop-shaped conductor connected to the IC chip 210, and so forth. Also, the inner periphery 221 of the antenna 220 has a shape like the letter T.

The sheet 200 and the antenna 220, for example, have outer shapes that match the blood collection tube 10, as shown in FIG. 1. For example, it is desirable to make the depth D0 of the sheet 200 and the depth D1 of the antenna 220 shorter than the minimum value of the perimeter in the predetermined application range 12 of the blood collection tube 10. As a result of this, for example, as shown in FIG. 1, the RFID tag 100 can be affixed to the blood collection tube 10 such that the RFID tag 100 does not overlap itself. Also, it is desirable to keep the width W0 of the sheet 200 and the width W1 of the antenna 220 within the predetermined application range 12 of the blood collection tube 10.

Note that the width W1 and the depth D1 of the antenna 220 can be determined flexibly within the above ranges. For example, if the frequency that the RFID tag 100 uses is 920 MHz, W1 can be 20.00 mm to 50.00 mm, preferably 30.00 mm to 40.00 mm. Also, D1 can be 13.00 mm to 18.00 mm, preferably 15.00 mm to 17.00 mm.

The sheet 200 is, for example, a band-like film formed by laminating a plurality of synthetic resin films such as polyethylene terephthalate and polypropylene. However, the sheet 200 is by no means limited to this, and the sheet 200 may be made of paper or the like. The IC chip 210 and the antenna 220 are arranged so as to be, for example, sandwiched between a plurality of laminated synthetic resin films. Note that the RFID tag 100 may be provided in a label that is applied to the blood collection tube 10.

The IC chip 210 is an REIN system integrated circuit on which identification information is recorded, and is electrically connected to the antenna 220. The IC chip 210 receives, via the antenna 220, radio waves transmitted at a predetermined radio frequency (for example, 920 MHz band: 860 MHz to 960 MHz) from the tag reader of the RFID system, generates power from the received radio waves, and is activated. Also, the IC chip 210 uses the generated power to transmit radio waves containing identification information pre-recorded in the IC chip 104, to the tag reader.

The antenna 220 is made of a highly conductive conductor (for example, a metal such as copper or aluminum) in a loop shape. Also, the inner periphery 221 of the antenna 220 is shaped like the letter T, and the conductor is not formed in this inner periphery 221. In this embodiment, this part inside the inner periphery 221 where no conductor is formed is referred to as an "opening 222." Thus, the antenna 220 is made of a loop-shaped conductor connected to the IC chip 210, and has a T-shaped opening 222 in which no conductor is formed.

Preferably, the outer shape of the antenna 220 is a rectangle with a width of W1 and a depth of D1, as shown in FIG. 2. Also, the opening 222 includes: a first opening 223 that extends in a direction (X-axis direction) parallel to one side of the rectangle on which the IC chip 210 is mounted; and a second opening 224 that is connected to a central part of the first opening 223, and that extends in a direction perpendicular to one side of the rectangle on which the IC chip 210 is mounted (minus Y-axis direction). Note that, in FIG. 2, the dashed two-dotted line, representing the boundary between the first opening 223 and the second opening 224, is an imaginary line and does not really exist.

Preferably, the RFID tag 100 is applied to the blood collection tube 10 such that the longitudinal direction of the blood collection tube 10 and the direction in which the first opening 223 extends (X-axis direction) are substantially parallel. By this means, better communication characteristics can be achieved. Note that, when the RFID tag 100 is applied to the blood collection tube 10, there is no significant difference in communication characteristics between the case in which the plus X direction of the RFID tag 100 shown in FIG. 2 faces the cap 11 of the blood collection tube 10, and the case in which the minus X direction of the RFID tag 100 shown in FIG. 2 faces the cap 11 of the blood collection tube 10.

Note that the RFID tag 100 may be applied to the blood collection tube 10 such that, for example, the longitudinal direction of the blood collection tube 10 and the direction in which the first opening 223 extends cross.

Note that the width W2 and depth D2 of the first opening 223 and the width W3 and depth D3 of the second opening 224 can be determined flexibly. For example, when the frequency the RFID tag 100 uses is 920 MHz, W2 can be 18.00 mm to 25.00 mm, preferably 20.00 mm to 23.00 mm, more preferably 21.10 mm to 22.10 mm. D2 can be 1.00 mm to 7.00 mm, preferably 3.00 mm to 5.00 mm, more preferably 3.50 mm to 4.50 mm. W3 can be 1.00 mm to 7.00 mm, preferably 3.00 mm to 5.00 mm, more preferably 3.7 mm to 4.7 mm. D3 can be 3.00 mm to 9.00 mm, preferably 5.00 mm to 7.00 mm, more preferably 5.50 mm to 6.5 mm.

The antenna 220 is made of a conductor such as a metal foil like copper or aluminum that is pressed, etched, or plated, a metal paste that is silk-screen-printed, and so forth. Note that, if the conductor is aluminum, the thickness of the conductor can be, for example, 5 µm to 40 µm, preferably 7 µm to 30 µm. Also, although the antenna 220 is hatched in FIG. 2 and others, this hatching only indicates that the antenna 220 is made of metal, and is not a pattern.

In the above structure, the IC chip 210 has internal capacitance, and this internal capacitance and the inductance component of the antenna 220 form a resonant circuit (matching circuit). In this resonant circuit, the imaginary component becomes practically zero at the resonance frequency at which the internal capacitance of the IC chip 210 and the inductance component of the antenna 220 resonate, thereby achieving impedance matching and ensuring a sufficient communication distance.

The RFID tag 100 is thus configured to achieve a good communication distance regardless of the presence or absence of liquid (for example, blood) in the blood collection tube 10 at, for example, a frequency in the 920 MHz band (860 MHz to 960 MHz, preferably 915 MHz to 935 MHz).

<The Shape and Impedance Characteristics of the Antenna>

Figure 3:
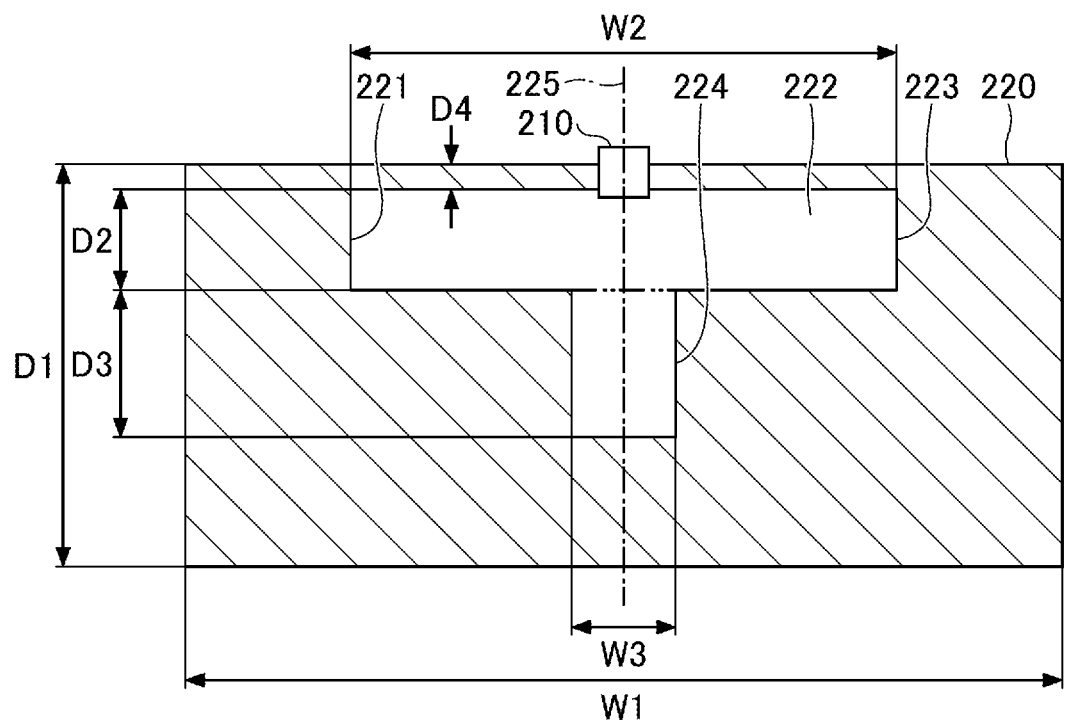
FIG. 3 is a diagram that illustrates the shape of an antenna according to one embodiment.

FIG. 3 is a diagram that illustrates the shape of the antenna according to one embodiment. This figure illustrates an example of the shape of the antenna 220 with which good communication characteristics have been achieved. Referring to FIG. 3, the width W1 of the antenna 220 was made 35.00 mm and the depth D1 was made 16.00 mm, and the opening 222 was formed so as to be symmetrical with respect to the center line 225. Note that the symmetrical shape tolerates error and deviation insofar as such error and deviation do not mitigate the effect of the present invention. Also, samples of the antenna 220 were prepared by changing the T shape of the opening 222 of the antenna 220, and measurements were conducted per sample, to determine the T shape of the opening 222 whereby good communication characteristics could be achieved regardless of the presence or absence of liquid.

As a result of this, good communication characteristics were achieved, regardless of the presence or absence of liquid inside the blood collection tube 10, when the width W2 of the first opening 223 was 21.60 mm and the depth D2 was 4.00 mm, and the width W3 of the second opening 224 was 4.20 mm and the depth D3 was 6.00 mm. Note that the width D4 of the conductor connecting the IC chip 210 was made 1.00 mm. Also, aluminum (10-µm thick) was used as the conductor to form the antenna 220.

Figure 4:
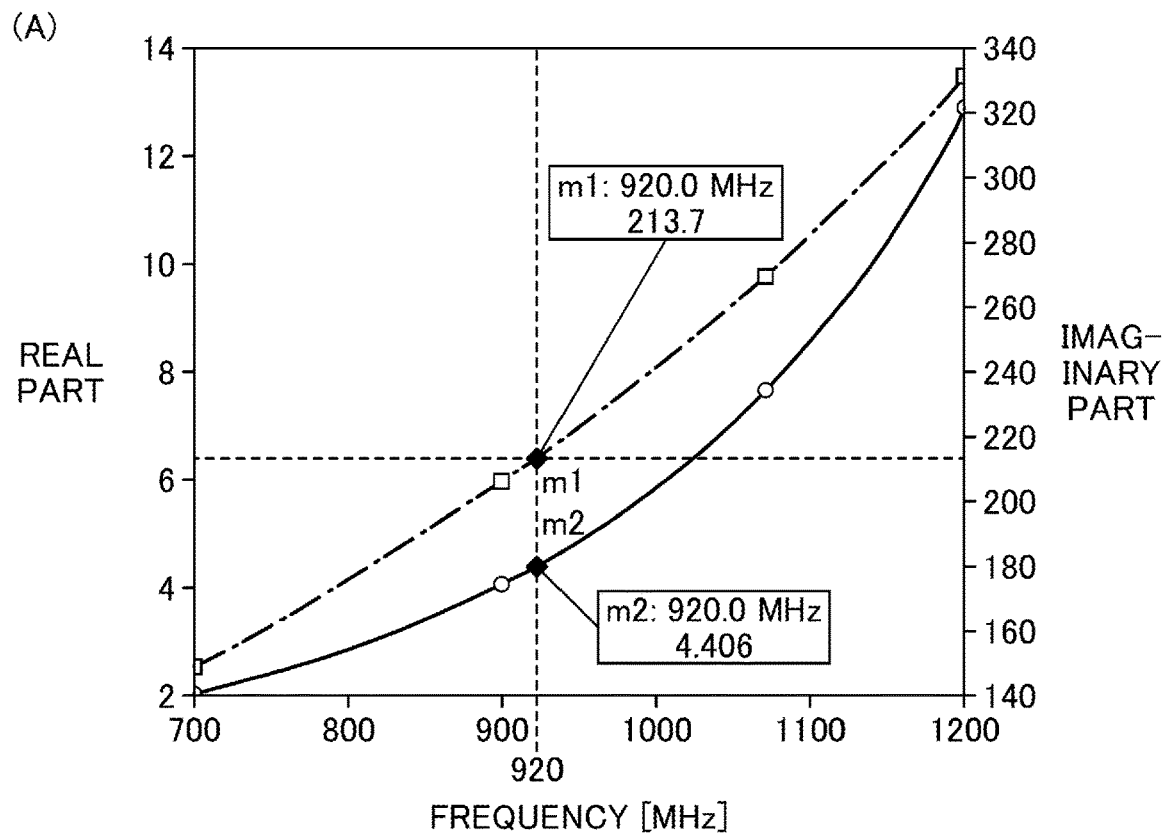
FIG. 4 is a diagram that illustrates an example of impedance characteristics of an antenna according to one embodiment.
Figure 4:
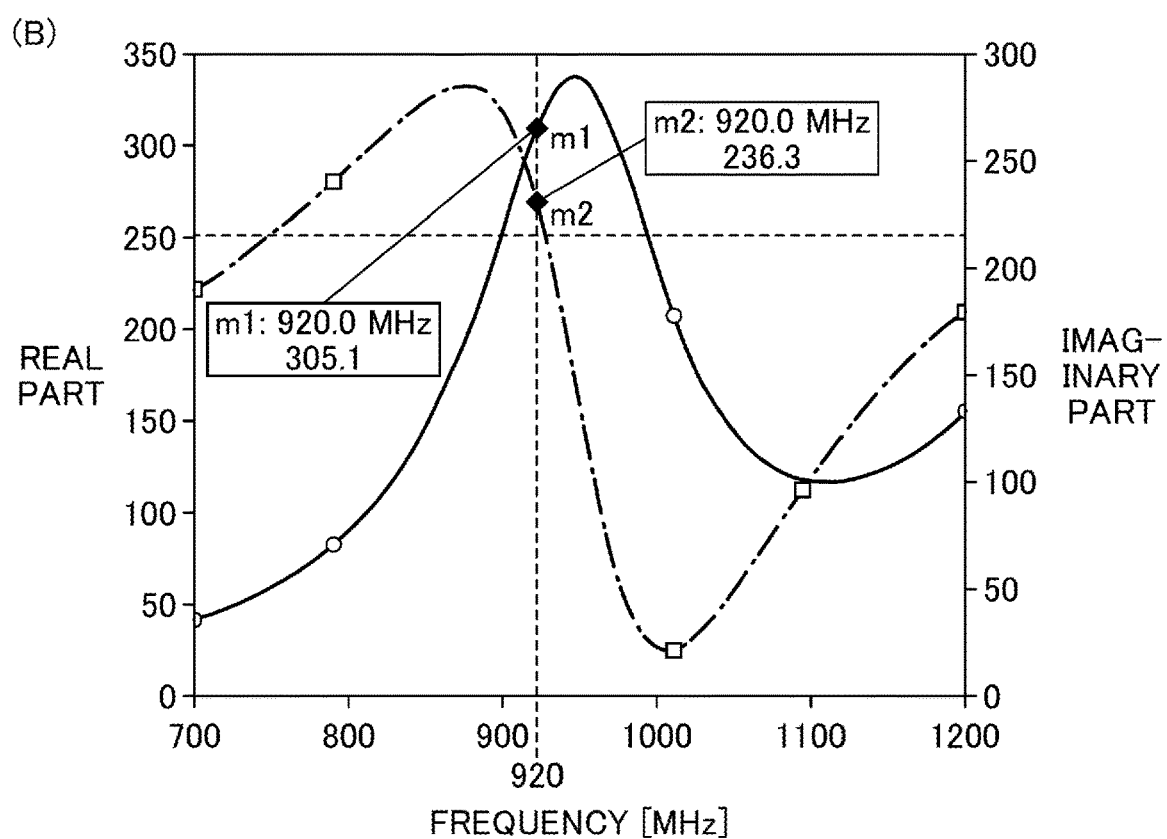

FIG. 4 is a diagram that illustrates an example of impedance characteristics of the antenna according to one embodiment. FIG. 4(A) shows a simulation result of impedance characteristics of the antenna 220 when the blood collection tube 10 holds no liquid. Also, FIG. 4(B) shows a simulation result of impedance characteristics of the antenna 220 when the blood collection tube 10 holds liquid (water).

In FIGS. 4(A) and (B), the impedance Z of the antenna 220 is "Z=R+jX," and the vertical axis is the value of the real part R and the value of the imaginary part X of the impedance Z. Also, the horizontal axis is the frequency. Note that, in both graphs, the solid line plots the real part R corresponding to each frequency, and the dashed line plots the imaginary part X corresponding to each frequency.

The example of FIG. 4(A) shows that, at 920 MHz, which is the center frequency of the frequency band that the RFID tag 100 uses for communication, the value of the real part R in the impedance Z of the antenna 220 is approximately 4.4Ω, and the value of the imaginary part X is approximately 213.0Ω. In the example of FIG. 4(B), at a frequency of 920 MHz, the value of the real part R in the impedance Z of the antenna 220 is approximately 305.0Ω and the value of the imaginary part X is approximately 236.0Ω. Thus, the impedance Z of the antenna 220 changes depending on whether the blood collection tube 10 holds liquid inside.

Also, from the results of preparing a number of samples of antennas, it was found out that good communication characteristics could be achieved when the value of the imaginary part X at a frequency of 920 MHz was around 213Ω (for example, approximately 190Ω to 240Ω). Based on this, it is likely that, when the value of the imaginary part X of the impedance Z of the antenna is around 213Ω, the internal capacitance of the IC chip 210 and the inductance component of the antenna 220 resonate in the 920 MHz band, and impedance matching is achieved.

That is, FIGS. 4(A) and (B) show that the value of the imaginary part X of the impedance Z is 190Ω to 240Ω at 920 MHz, so that the antenna 220 achieves good communication characteristics regardless of the presence or absence of liquid in the blood collection tube 10. Note that the evaluation results of communication characteristics of the RFID tag 100 having the antenna 220 will be described later.

Comparative Example

Figure 5:
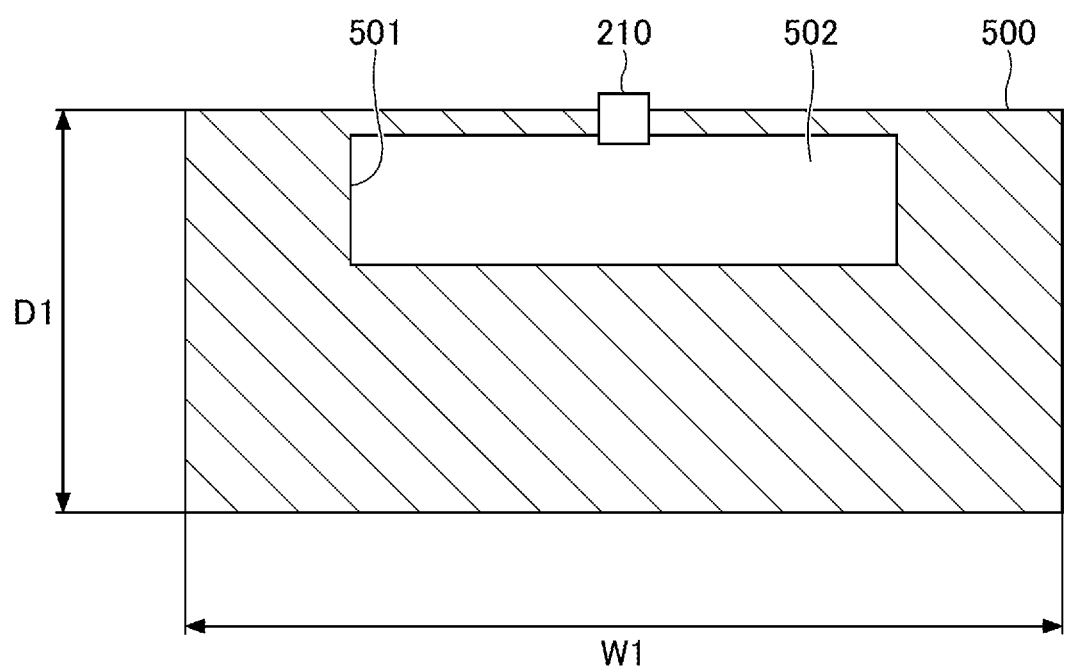
FIG. 5 is a diagram that illustrates an example of the shape of an antenna according to a comparative example.

FIG. 5 is a diagram that illustrates an example of the shape of an antenna according to a comparative example. The antenna 500 shown in FIG. 5 has the same outer shape (W1=35.00 mm, D1=16.00 mm) as the antenna 220 according to one embodiment shown in FIG. 3, and an opening 502 is formed as a rectangle inside the inner periphery 501 of the antenna 500. Also, the antenna 500 is formed such that the area of the opening 502 is the same as the area of the opening 222 of the antenna 220 according to one embodiment shown in FIG. 3.

Figure 6:
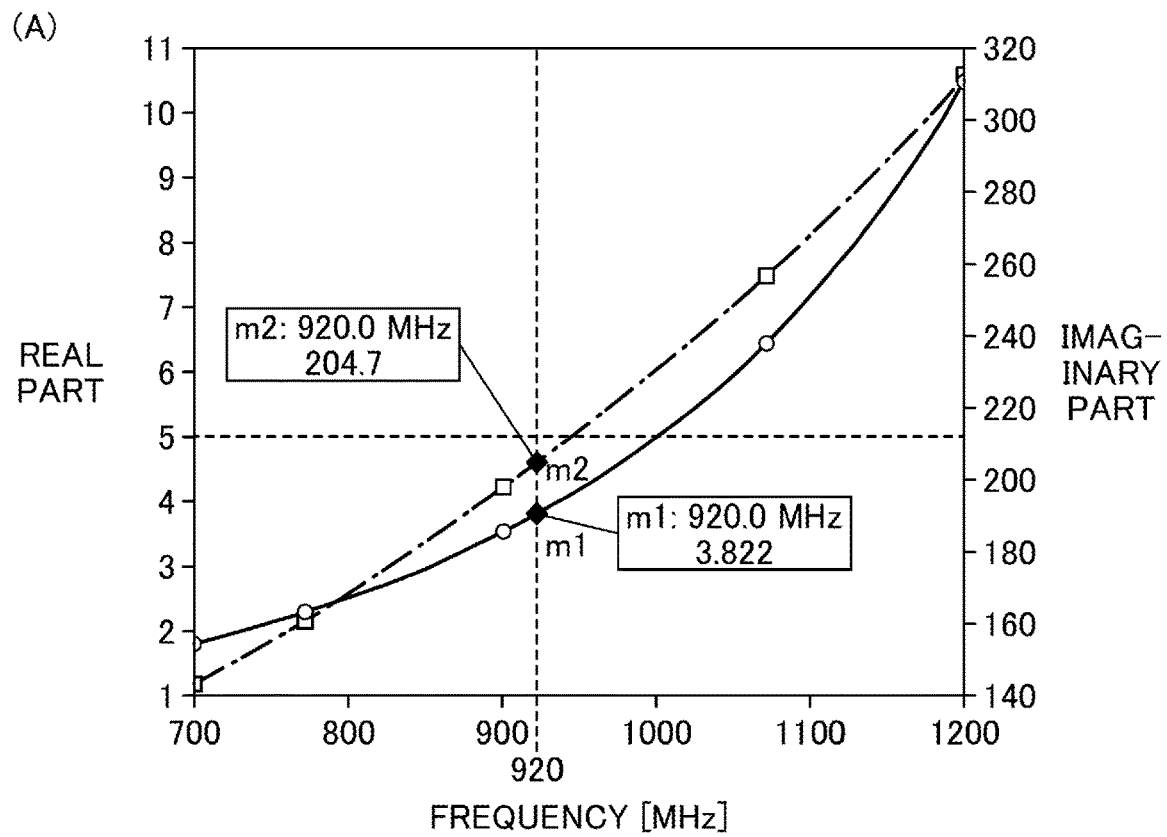
FIG. 6 is a diagram that illustrates an example of impedance characteristics of an antenna according to a comparative example.
Figure 6:
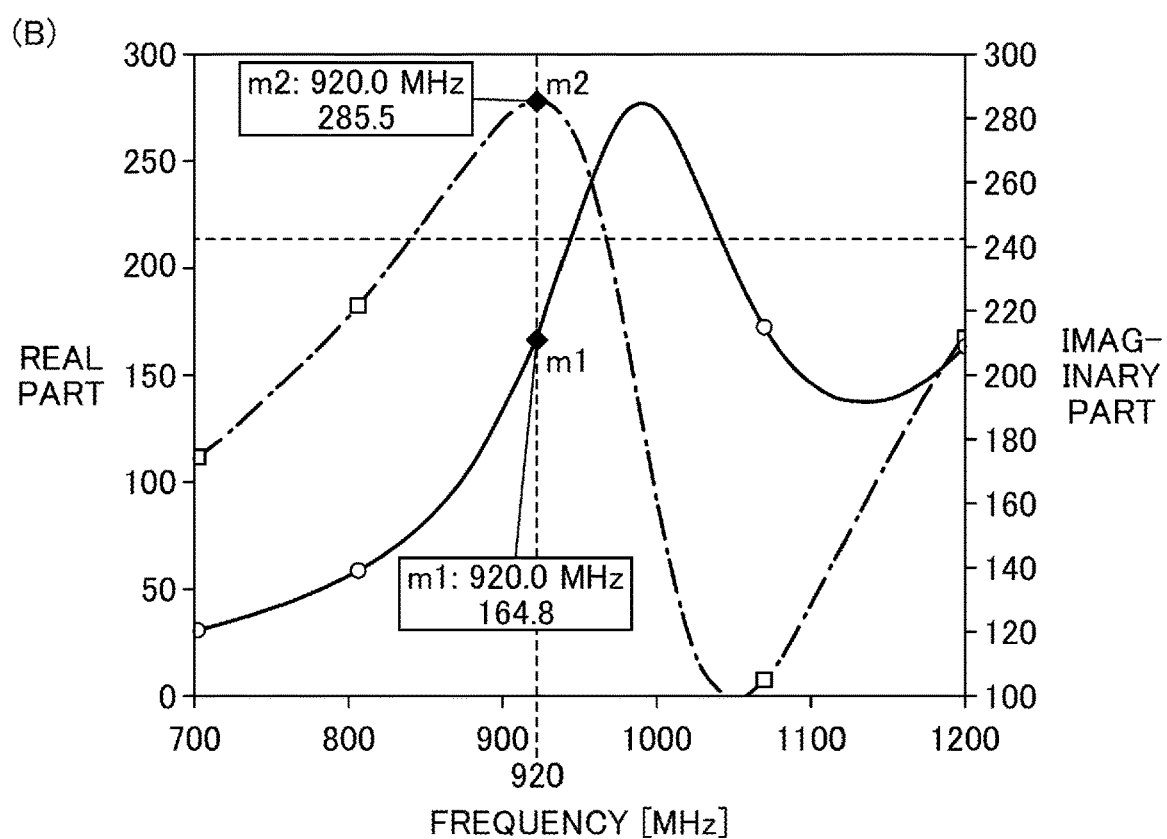

FIG. 6 is a diagram that illustrates an example of impedance characteristics of an antenna according to a comparative example. FIG. 6(A) shows a simulation result of impedance characteristics of the antenna 500 when the blood collection tube 10 holds no liquid. The example of FIG. 6(A) shows that, at 920 MHz, which is the frequency the RFID tag 100 uses for communication, the value of the real part R of the impedance Z of the antenna 500 is approximately 3.8Ω and the value of the imaginary part X is approximately 204.7Ω. Thus, when the blood collection tube 10 holds no liquid, the impedance Z of the antenna 500 according to the comparative example shows impedance characteristics close to those of the antenna 220 according to one embodiment shown in FIG. 3.

On the other hand, FIG. 6(B) shows a simulation result of impedance characteristics of the antenna 500 when the blood collection tube 10 holds liquid (water). The example of FIG. 6(B) shows that, at a frequency of 920 MHz, the value of the real part R of the impedance Z of the antenna 500 is approximately 164.8Ω, and the value of the imaginary part X is approximately 285.5Ω. Thus, it is clear that the impedance Z of the antenna 500 according to the comparative example changes up to approximately 285Ω when the blood collection tube 10 holds liquid.

Thus, the antenna 220 according to one embodiment shown in FIG. 3 shows a lower impedance Z than the antenna 500 according to a comparative example shown in FIG. 5, and the value of the imaginary part X, that is, the resonance frequency, changes less, especially when the blood collection tube 10 holds liquid.

Modifications

Next, changes in impedance characteristics when the shape of the T-shaped opening 222 of the antenna 220 is varied will be described by illustrating a number of modifications.

First Modification

Figure 7:
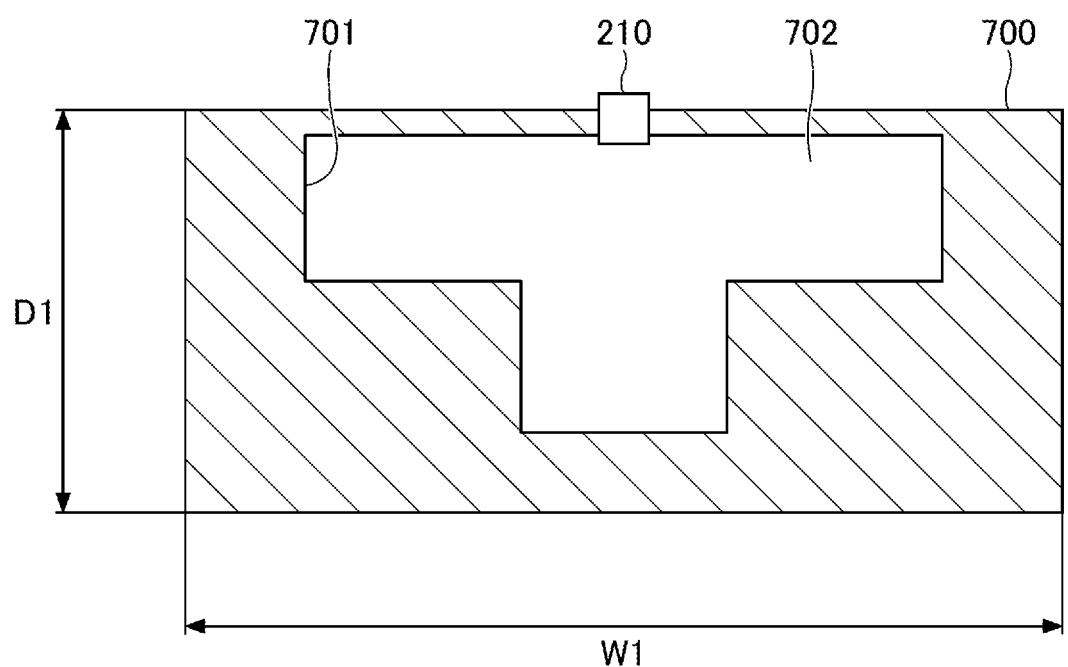
FIG. 7 is a diagram that illustrates an example of the shape of an antenna according to a first modification.

FIG. 7 is a diagram that illustrates an example of the shape of an antenna according to a first modification. An antenna 700 according to the first modification shown in FIG. 7 has the same outer diameter (W1=35.00 mm and D1=16.00 mm) as the antenna 220 according to one embodiment shown in FIG. 7. Also, the antenna 700 is formed such that the area of the opening 702 inside the inner periphery 701 is larger than the area of the opening 222 of the antenna 220 according to one embodiment shown in FIG. 3.

Figure 8:
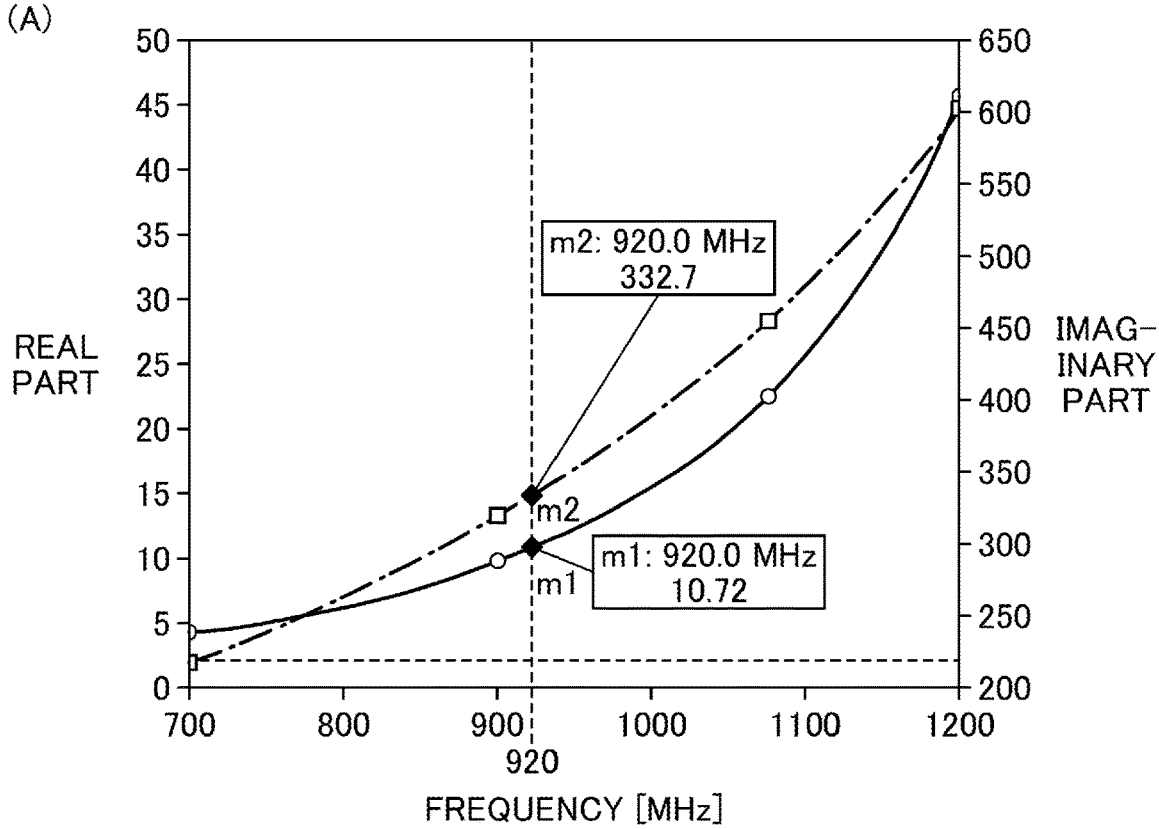
FIG. 8 is a diagram that illustrates an example of impedance characteristics of the antenna according to the first modification.
Figure 8:
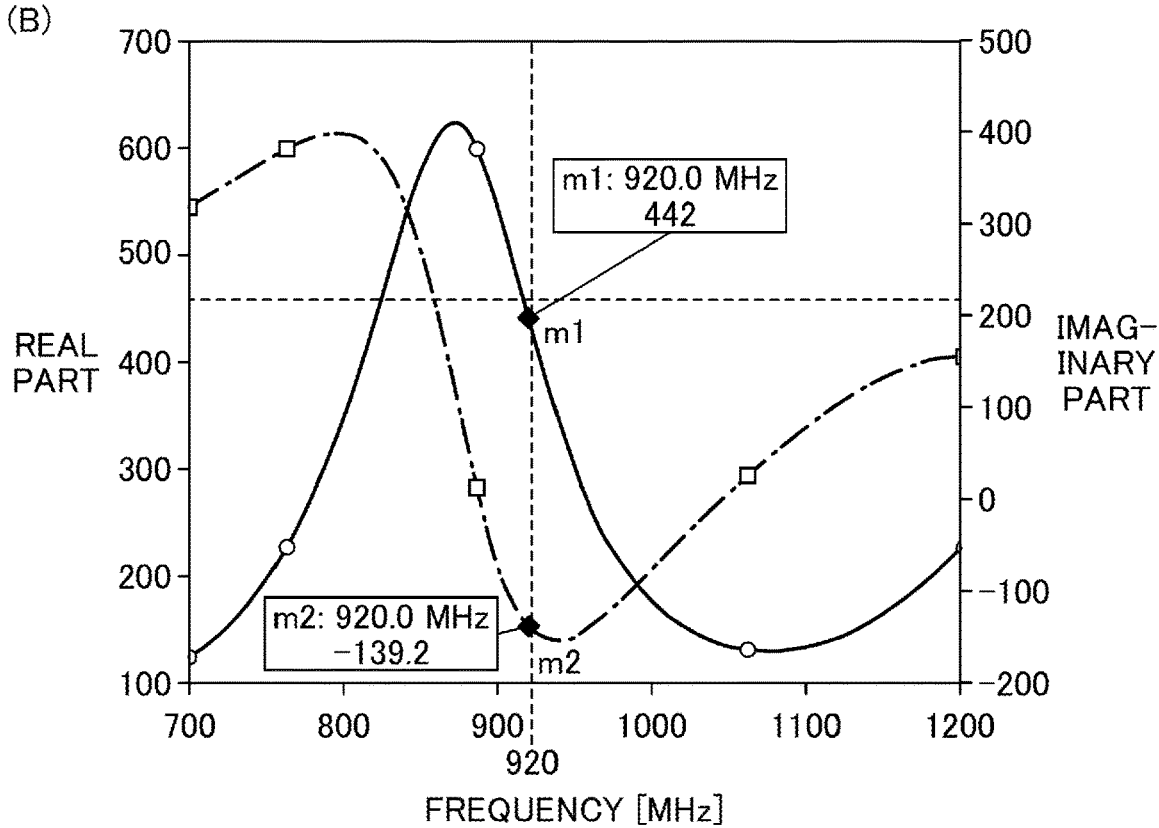

FIG. 8 is a diagram that illustrates an example of impedance characteristics of the antenna according to the first modification. FIG. 8(A) shows a simulation result of impedance characteristics of the antenna 700 when the blood collection tube 10 holds no liquid. Also, FIG. 8(B) shows a simulation result of impedance characteristics of the antenna 700 when the blood collection tube 10 holds liquid (water).

The example of FIG. 8(A) shows that, at 920 MHz, which is the frequency the RFID tag 100 uses for communication, the value of the real part R of the impedance Z of the antenna 700 is approximately 10.7Ω, and the value of the imaginary part X is approximately 332.0Ω. The example of FIG. 8(B) shows that, at a frequency of 920 MHz, the value of the real part R of the impedance Z of the antenna 700 is approximately 442.0Ω, and the value of the imaginary part X is approximately −139.0Ω.

Also, in FIG. 8(A), the frequency at which the value of the imaginary part X of the impedance Z of the antenna 700 is around 213Ω changes to a low frequency near 700 MHz.

Thus, by increasing the inner area of the T shape of the opening 222 of the antenna 220 according to one embodiment shown in FIG. 3, the resonance frequency of the antenna 220 can be changed (adjusted) to be lower.

Second Modification

Figure 9:
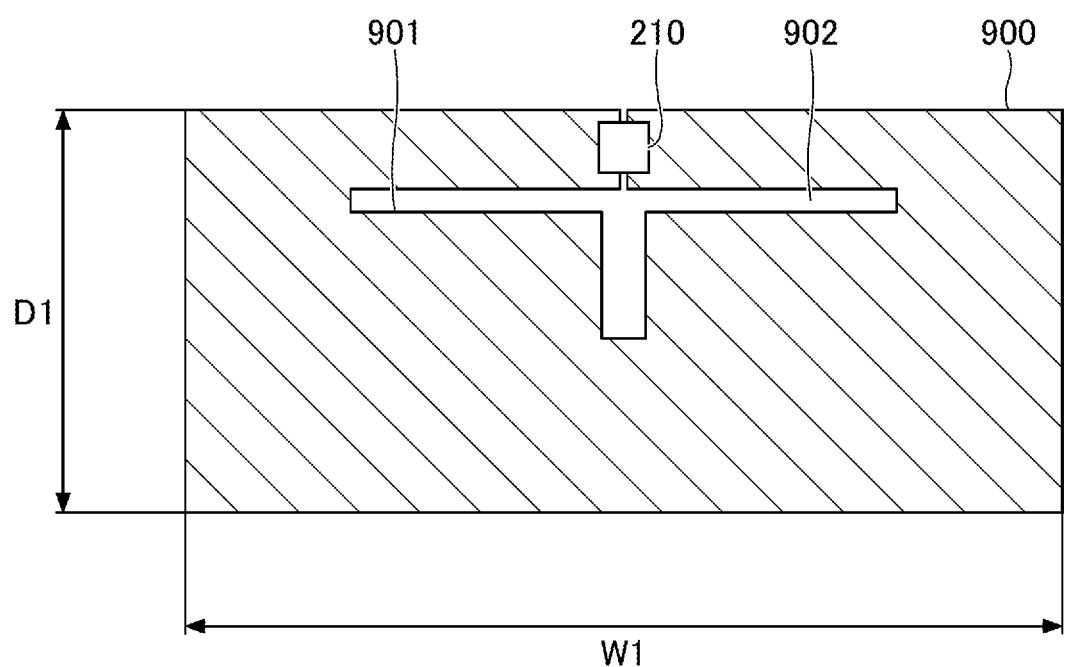
FIG. 9 is a diagram that illustrates an example of the shape of an antenna according to a second modification.

FIG. 9 is a diagram that illustrates an example of the shape of an antenna according to a second modification. An antenna 900 according to the second modification shown in FIG. 9 has the same outer shape (W1=35.00 mm and D1=16.00 mm) as the antenna 220 according to one embodiment shown in FIG. 3. Also, the antenna 900 is formed such that the area of the opening 902 inside the inner periphery 901 is smaller than the area of the opening 222 of the antenna 220 according to one embodiment shown in FIG. 3.

Figure 10:
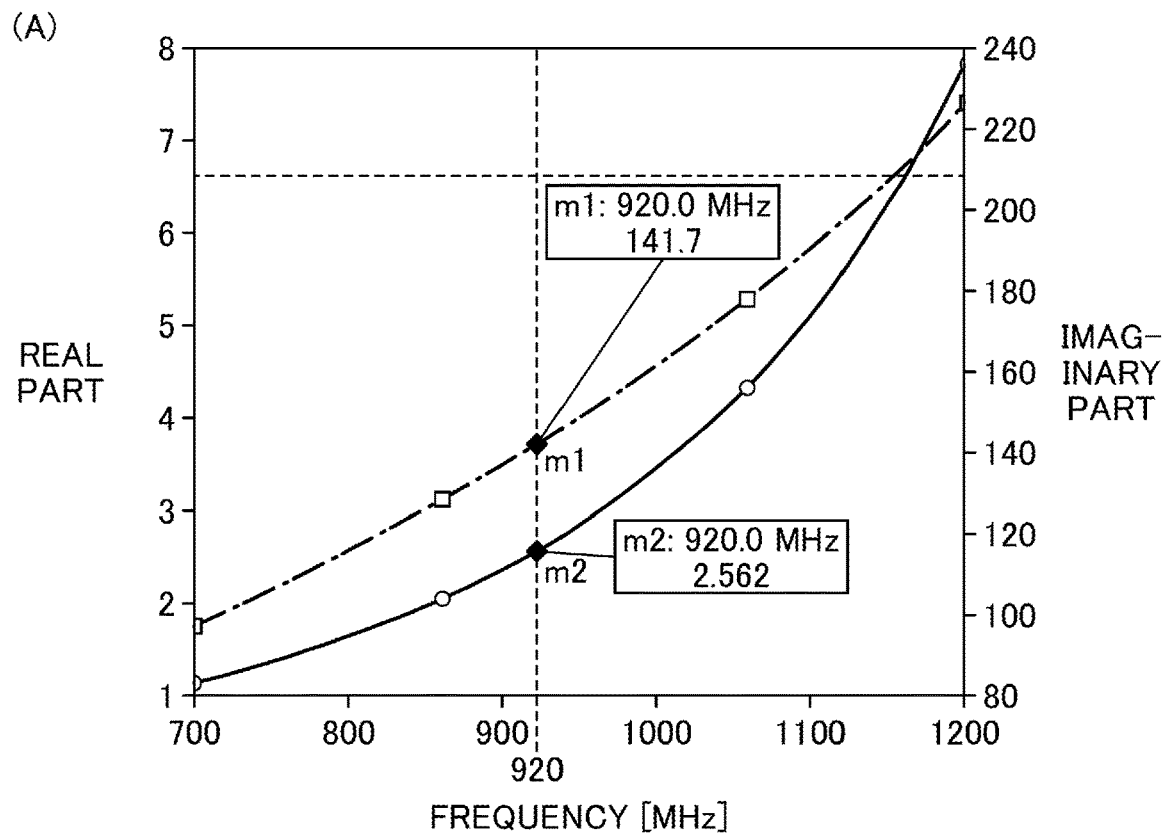
FIG. 10 is a diagram that illustrates an example of impedance characteristics of the antenna according to the second modification.
Figure 10:
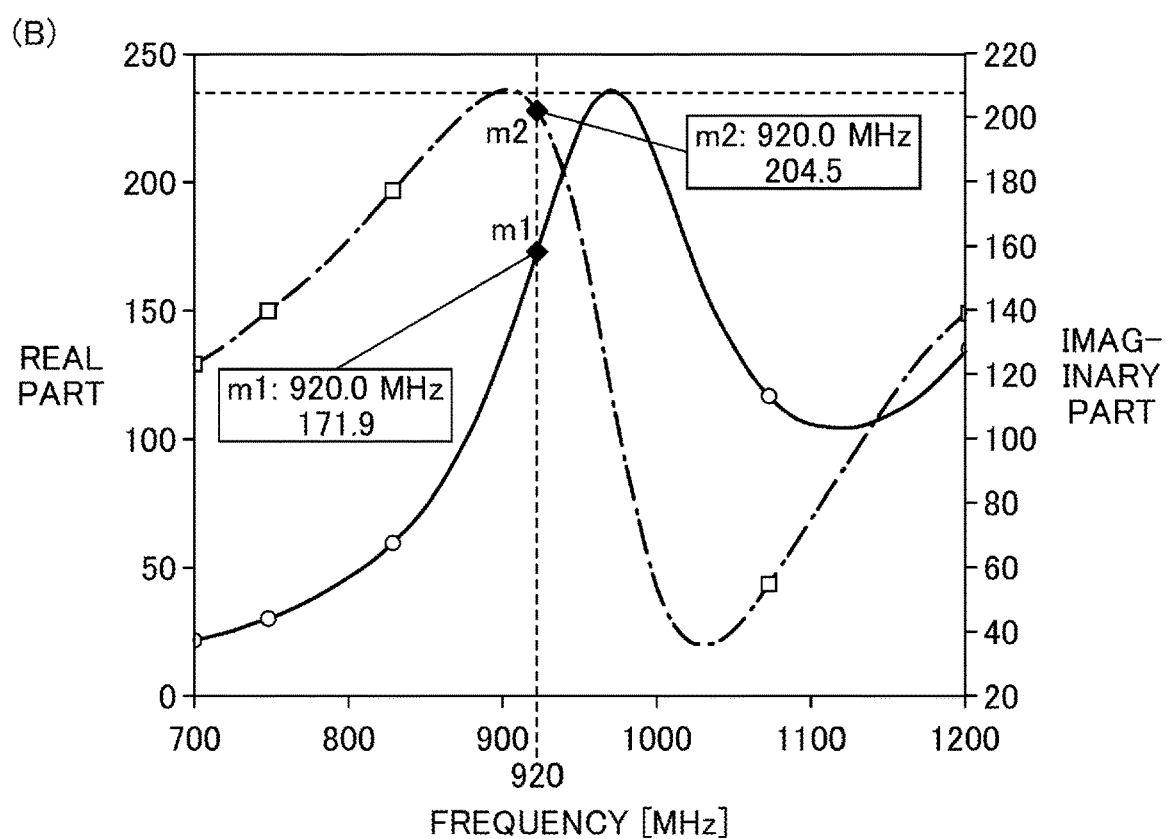

FIG. 10 is a diagram that illustrates an example of impedance characteristics of the antenna according to the second modification. FIG. 10(A) shows a simulation result of impedance characteristics of the antenna 900 when the blood collection tube 10 holds no liquid. Also, FIG. 10(B) shows a simulation result of impedance characteristics of the antenna 900 when the blood collection tube 10 holds liquid (water).

In the example of FIG. 10(A), at 920 MHz, which is the frequency the RFID tag 100 uses for communication, the value of the real part R of the impedance Z of the antenna 900 is approximately 2.6Ω, and the value of the imaginary part X is approximately 141.7Ω. The example of FIG. 10(B) shows that, at a frequency of 920 MHz, the value of the real part R of the impedance Z of the antenna 900 is approximately 171.9Ω, and the value of the imaginary part X is approximately 205.0Ω.

Also, in FIG. 10(A), the frequency at which the value of the imaginary part X of the impedance Z of the antenna 900 is around 213Ω changes to a high frequency near 1150 MHz.

Thus, by reducing the area of the opening 222 of the antenna 220 according to one embodiment shown in FIG. 3, the resonance frequency of the antenna 220 can be changed (adjusted) to be higher.

Third Modification

Figure 11:
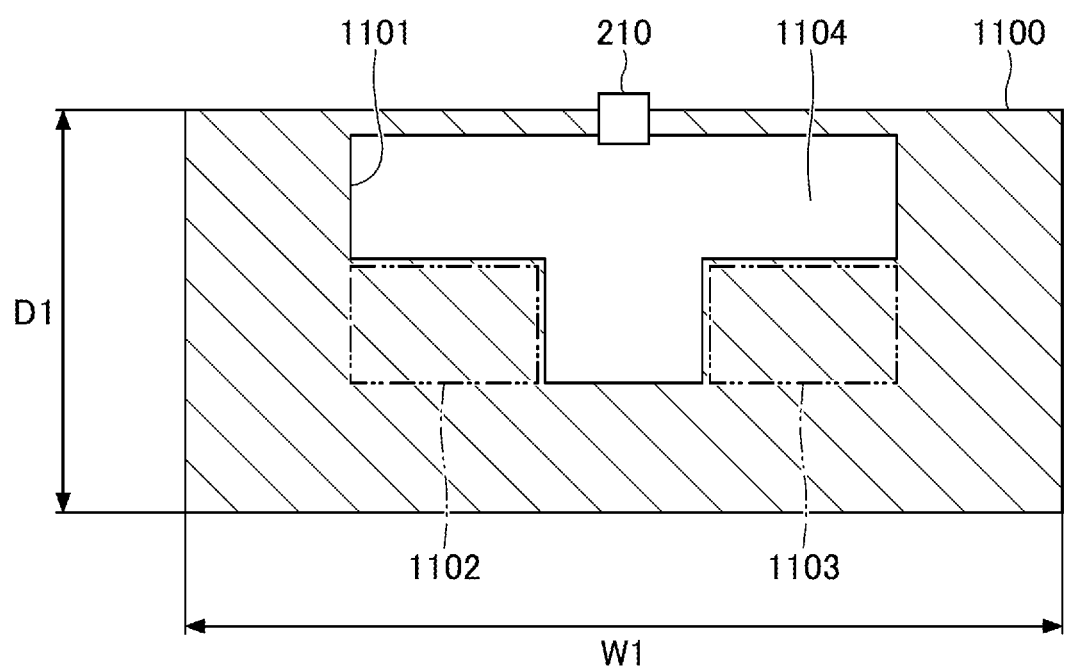
FIG. 11 is a diagram that illustrates an example of the shape of an antenna according to a third modification.

FIG. 11 is a diagram that illustrates an example of the shape of an antenna according to a third modification. An antenna 1100 according to the third modification shown in FIG. 11 has the same outer shape (W1=35.00 mm and D1=16.00 mm) as the antenna 220 according to one embodiment shown in FIG. 11. Also, the antenna 1100 according to the third modification is formed such that the size (area) of the two rectangular parts 1102 and 1103 shown in FIG. 11 is changed so as to make the area of the inner opening 1104 of the inner periphery 1101 larger than the area of the opening 222. Note that the dashed two-dotted lines in FIG. 11 are imaginary lines for explaining the positions of the rectangular parts 1102 and 1103 and do not really exist.

Figure 12:
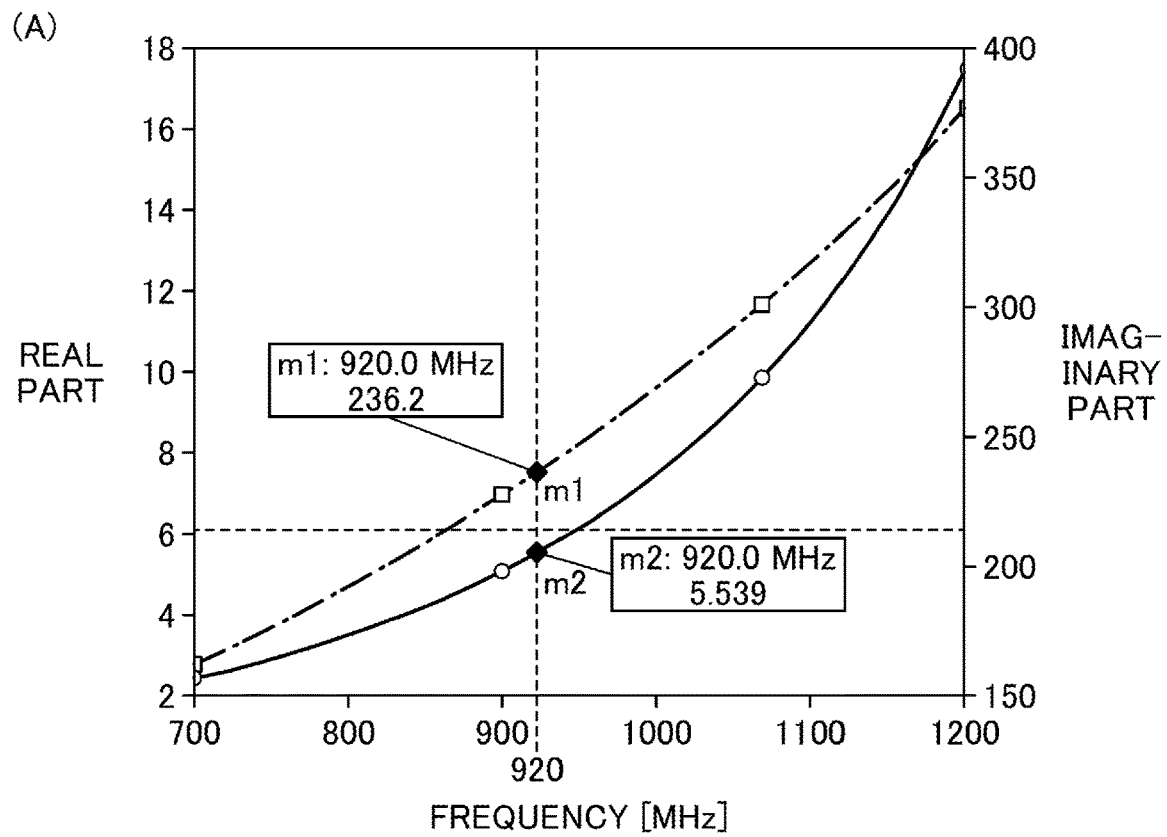
FIG. 12 is a diagram that illustrates an example of impedance characteristics of the antenna according to the third modification.
Figure 12:
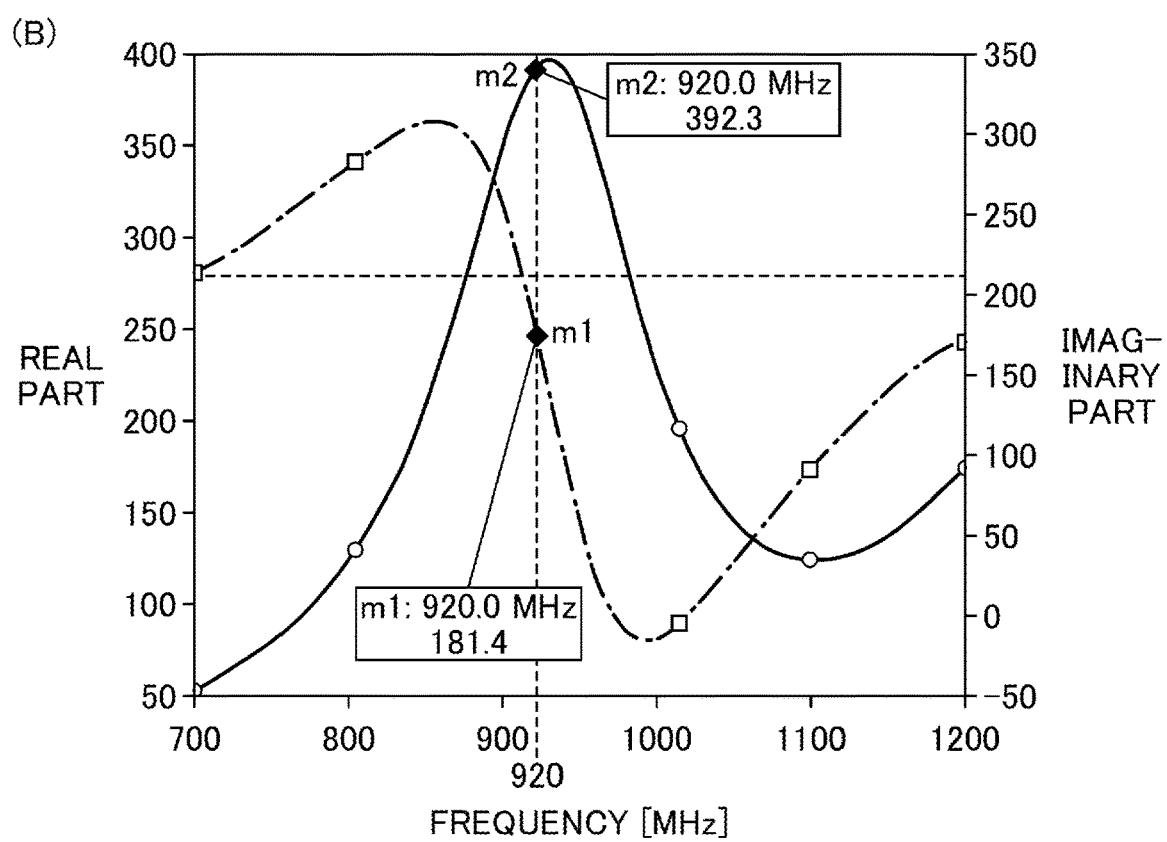

FIG. 12 is a diagram that illustrates an example of impedance characteristics of an antenna according to the third modification. FIG. 12(A) shows a simulation result of impedance characteristics of an antenna 1100 when the blood collection tube 10 holds no liquid. Also, FIG. 12(B) shows a simulation result of impedance characteristics of the antenna 1100 when the blood collection tube 10 holds liquid (water).

The example of FIG. 12(A) shows that, at 920 MHz, which is the frequency the RFID tag 100 uses for communication, the value of the real part R of the impedance Z of the antenna 1100 is approximately 5.54Ω, and the value of the imaginary part X is approximately 236.2Ω. The example of FIG. 12(B) shows that, at a frequency of 920 MHz, the value of the real part R of the impedance Z of the antenna 1100 is approximately 392.3Ω, and the value of the imaginary part X is approximately 181.4Ω.

Also, FIG. 12(A) makes it clear that the frequency at which the value of the imaginary part X of the impedance Z of the antenna 1100 is around 213Ω is near 870 MHz.

As described above, when increasing the area of the opening 222 of the antenna 220 according to one embodiment shown in FIG. 3, the size (area) of the rectangular parts 1102 and 1103 shown in FIG. 1I may be reduced, so that the impedance characteristics of the antenna 220 can be fine-tuned.

Fourth Modification

Figure 13:
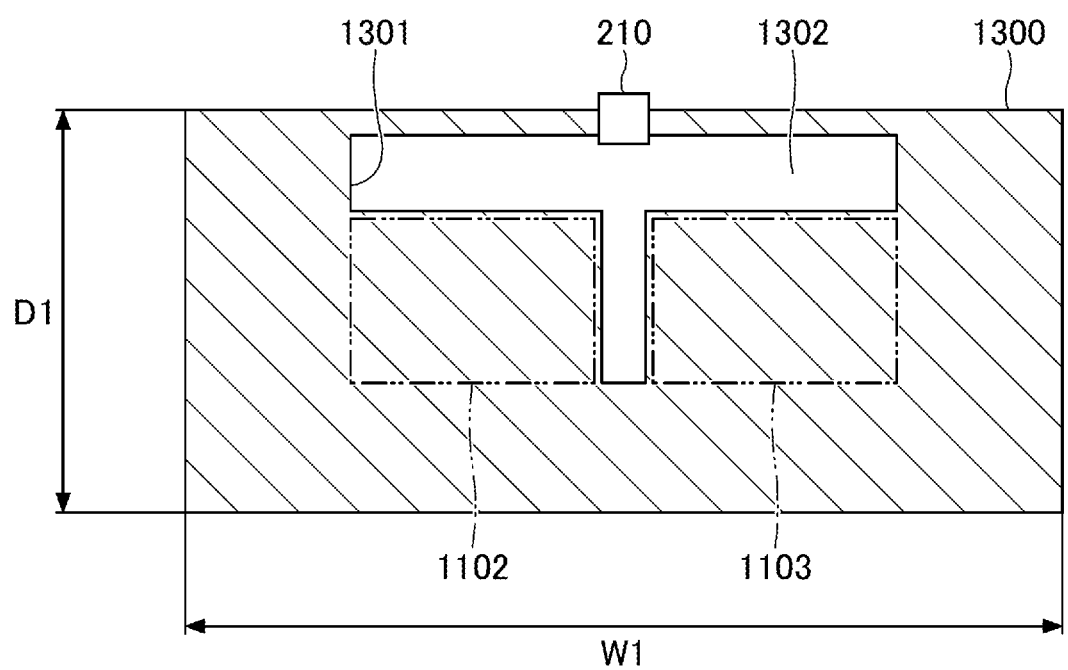
FIG. 13 is a diagram that illustrates an example of the shape of an antenna according to a fourth modification.

FIG. 13 is a diagram that illustrates an example of the shape of an antenna according to a fourth modification. An antenna 1300 according to the fourth modification shown in FIG. 13 has the same outer shape (W1=35.00 mm and D1=16.00 mm) as the antenna 220 according to one embodiment shown in FIG. 3. Also, the antenna 1300 according to the fourth modification is formed such that the size (area) of the two rectangular parts 1102 and 1103 is changed so as to make the area of the opening 1302 inside the inner periphery 1301 smaller than the area of the opening 222 of the antenna 220.

Figure 14:
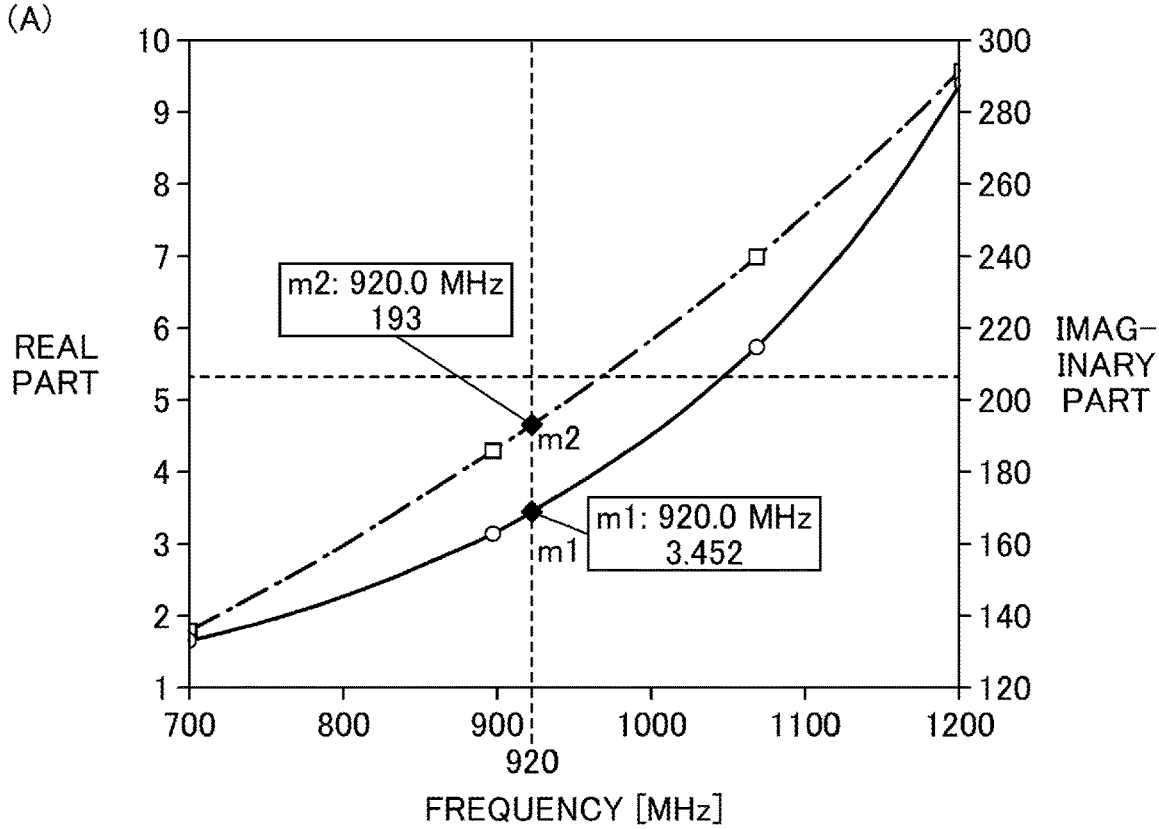
FIG. 14 is a diagram that illustrates an example of impedance characteristics of the antenna according to the fourth modification.
Figure 14:
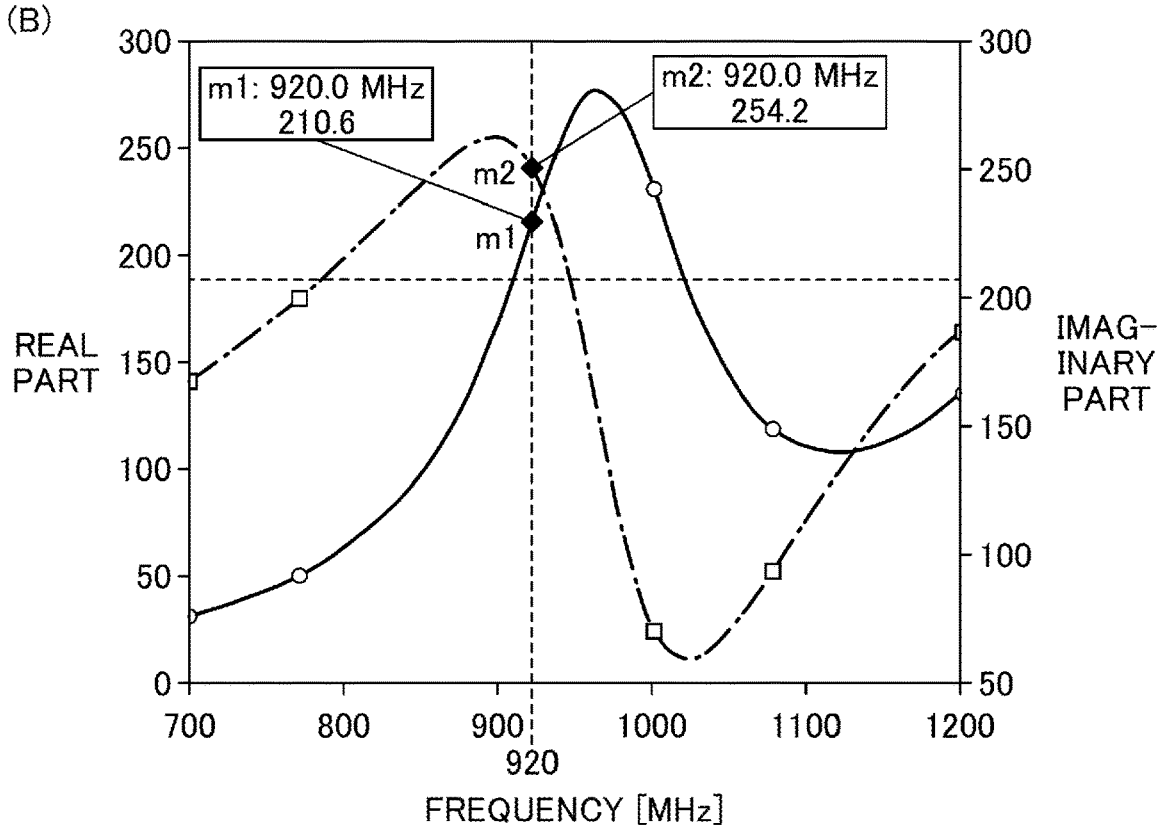

FIG. 14 is a diagram that illustrates an example of impedance characteristics of the antenna according to the fourth modification. FIG. 14(A) shows a simulation result of impedance characteristics of the antenna 1300 when the blood collection tube 10 holds no liquid. Also, FIG. 14(B) shows simulation results of impedance characteristics of the antenna 1300 when the blood collection tube 10 holds liquid.

The example of FIG. 14(A) shows that, at 920 MHz, which is the frequency the RFID tag 100 uses for communication, the value of the real part R of the impedance Z of the antenna 1300 is approximately 3.45Ω, and the value of the imaginary part X is approximately 193.0Ω. The example of FIG. 14(B) shows that, at a frequency of 920 MHz, the value of the real part R of the impedance Z of the antenna 1300 is approximately 210.6Ω, and the value of the imaginary part X is approximately 254.2Ω.

Also, FIG. 14(A) makes it clear that the frequency at which the value of the imaginary part X of the impedance Z of the antenna 1300 is around 213 Ω is near 950 MHz.

As described above, when reducing the area of the opening 222 of the antenna 220 according to one embodiment shown in FIG. 3, the size (area) of the rectangular parts 1102 and 1103 may be increased, so that the impedance characteristics of the antenna 220 can be fine-tuned.

Fifth Modification

Figure 15:
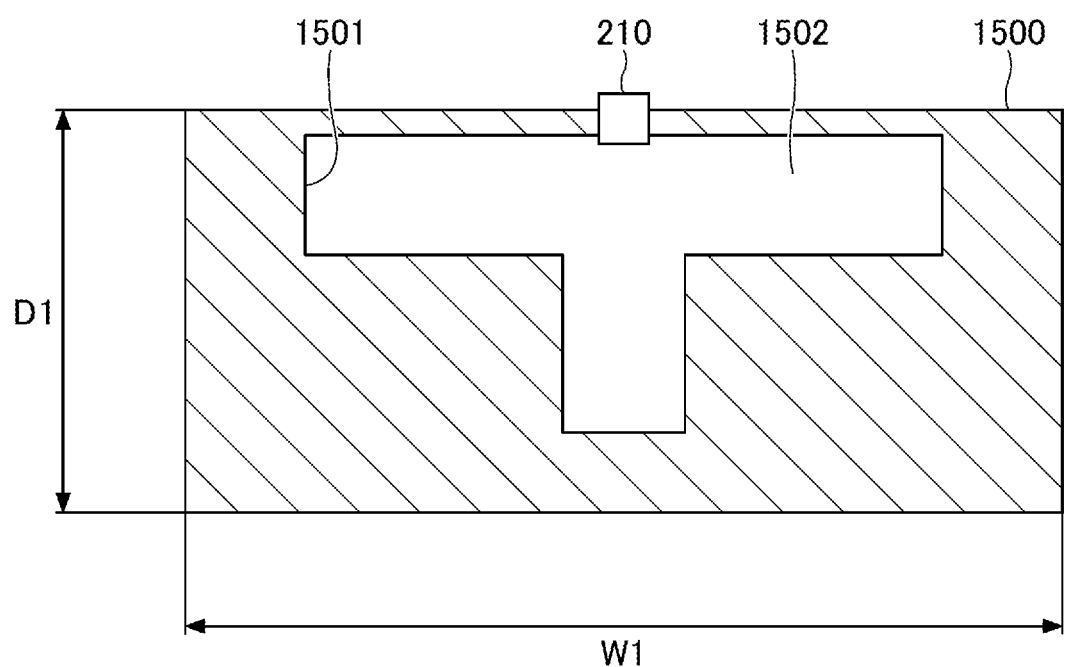
FIG. 15 is a diagram that illustrates an example of the shape of an antenna according to a fifth modification.

FIG. 15 is a diagram that illustrates an example of the shape of an antenna according to a fifth modification. An antenna 1500 according to the fifth modification shown in FIG. 15 has the same outer shape (W1=35.00 mm and D1=16.00 mm) as the antenna 220 according to one embodiment shown in FIG. 3. Also, with the antenna 1500 according to the fifth modification, when the area of the opening 222 of the antenna 220 according to one embodiment shown in FIG. 3 is increased, the area of the opening 1502 inside the inner periphery 1501 is increased, while maintaining a similar shape (similarity) to the shape of the letter T.

Figure 16:
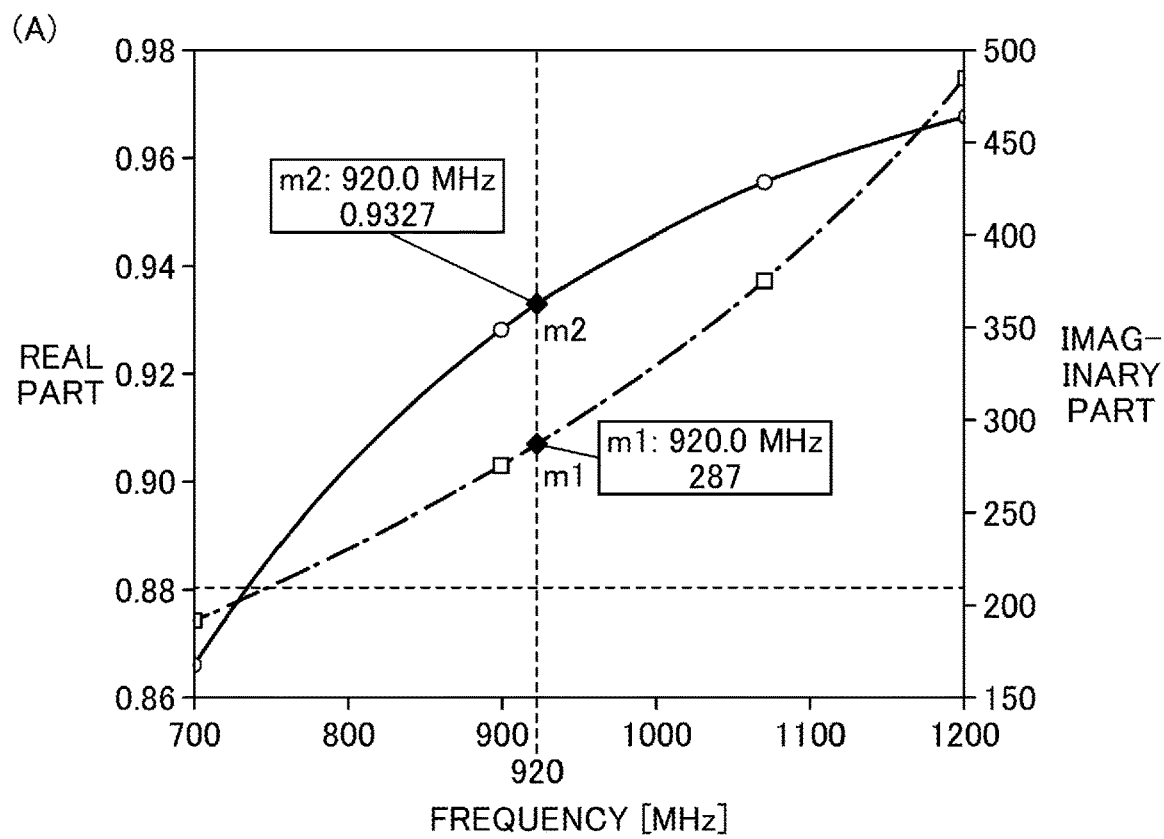
FIG. 16 is a diagram that illustrates an example of impedance characteristics of the antenna according to the fifth modification.
Figure 16:
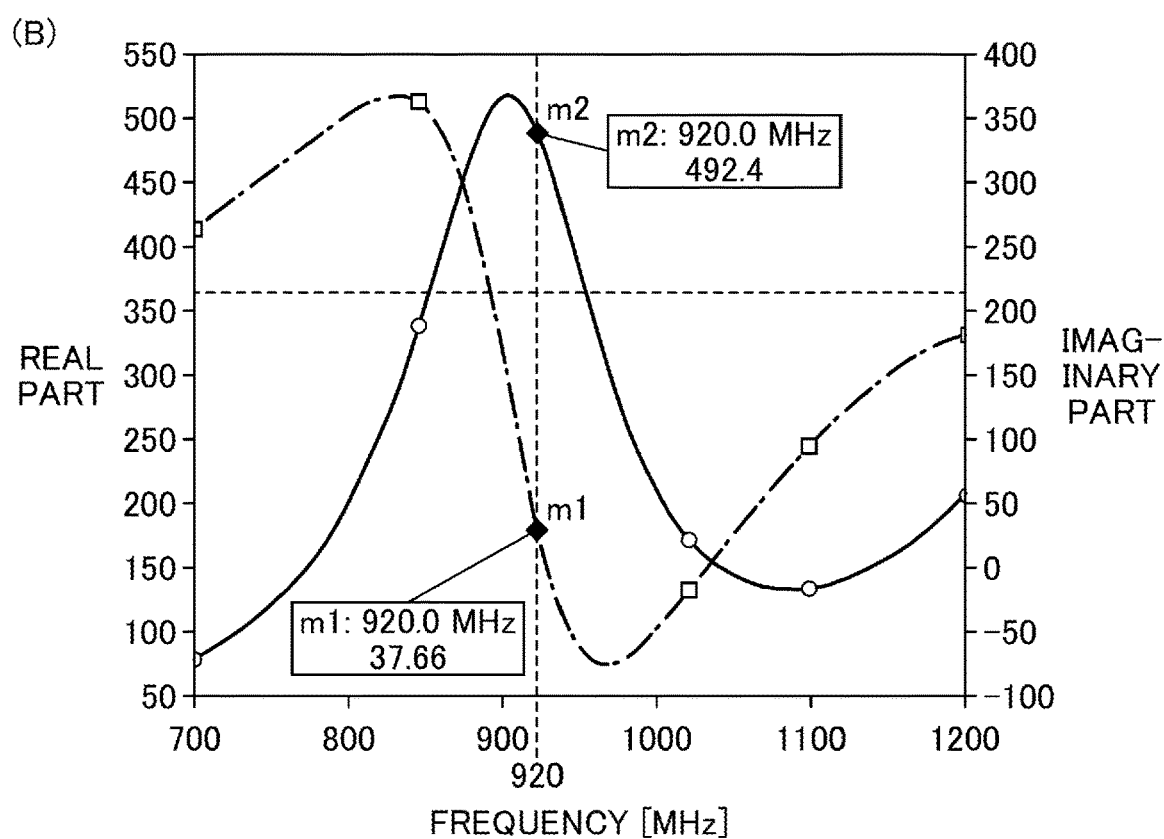

FIG. 16 is a diagram that illustrates an example of impedance characteristics of the antenna according to the fifth modification. FIG. 16(A) shows a simulation result of impedance characteristics of the antenna 1500 when the blood collection tube 10 holds no liquid. Also, FIG. 16(B) shows a simulation result of impedance characteristics of the antenna 1500 when the blood collection tube 10 holds liquid (water).

The example of FIG. 16(A) shows that, at 920 MHz, which is the frequency the RFID tag 100 uses for communication, the value of the real part R of the impedance Z of the antenna 1500 is approximately 0.93Ω, and the value of the imaginary part X is approximately 287.0Ω. The example of FIG. 16(B) shows that, at a frequency of 920 MHz, the value of the real part R of the impedance Z of the antenna 1500 is approximately 492.4Ω, and the value of the imaginary part X is approximately 37.7Ω.

Also, FIG. 16(A) makes it clear that the frequency at which the value of the imaginary part X of the impedance Z of the antenna 1500 is around 213Ω is near 750 MHz.

As described above, when the area of the opening 222 of the antenna 220 according to one embodiment shown in FIG. 3 is increased, the size (area) of the opening 222 may be increased, while maintaining a similar shape (similarity) to the shape of the letter T, so that the impedance characteristics of the antenna 220 can be changed more dynamically.

Sixth Modification

Figure 17:
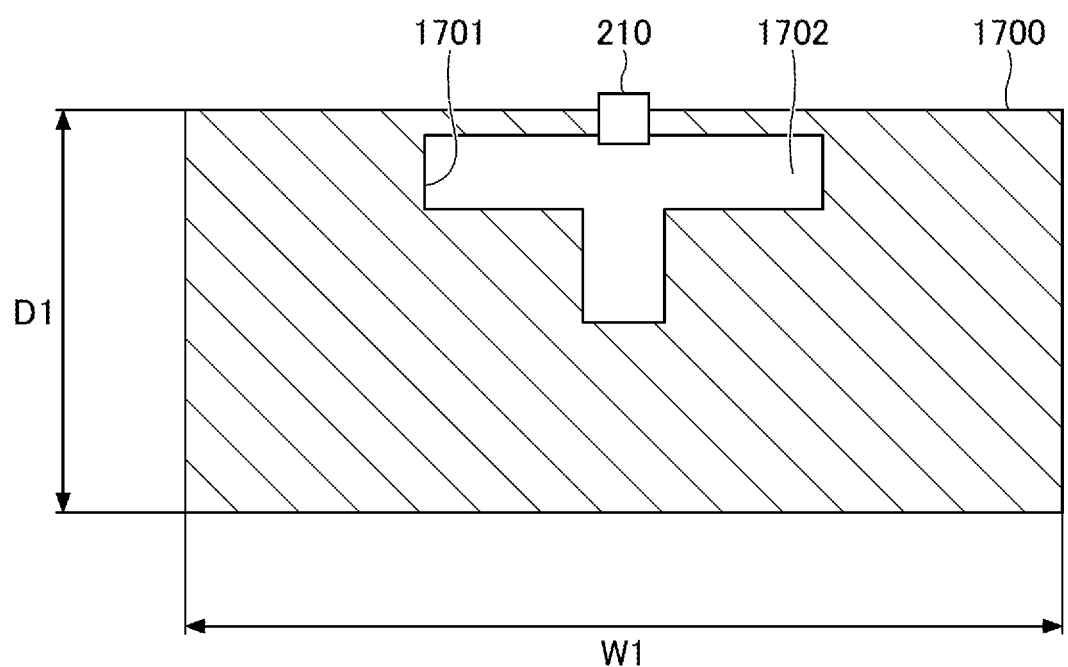
FIG. 17 is a diagram that illustrates an example of the shape of an antenna according to a sixth modification.

FIG. 17 is a diagram that illustrates an example of the shape of an antenna according to a sixth modification. An antenna 1700 according to the sixth modification shown in FIG. 17 has the same outer shape (W1=35.00 mm and D1=16.00 mm) as the antenna 220 according to one embodiment shown in FIG. 3. Also, with the antenna 1700 according to the sixth modification, when the area of the opening 222 of the antenna 220 according to one embodiment shown in FIG. 3 is reduced, the area of the opening 1702 inside the inner periphery 1701 is reduced while maintaining a similar shape (similarity) to the shape of the letter T.

Figure 18:
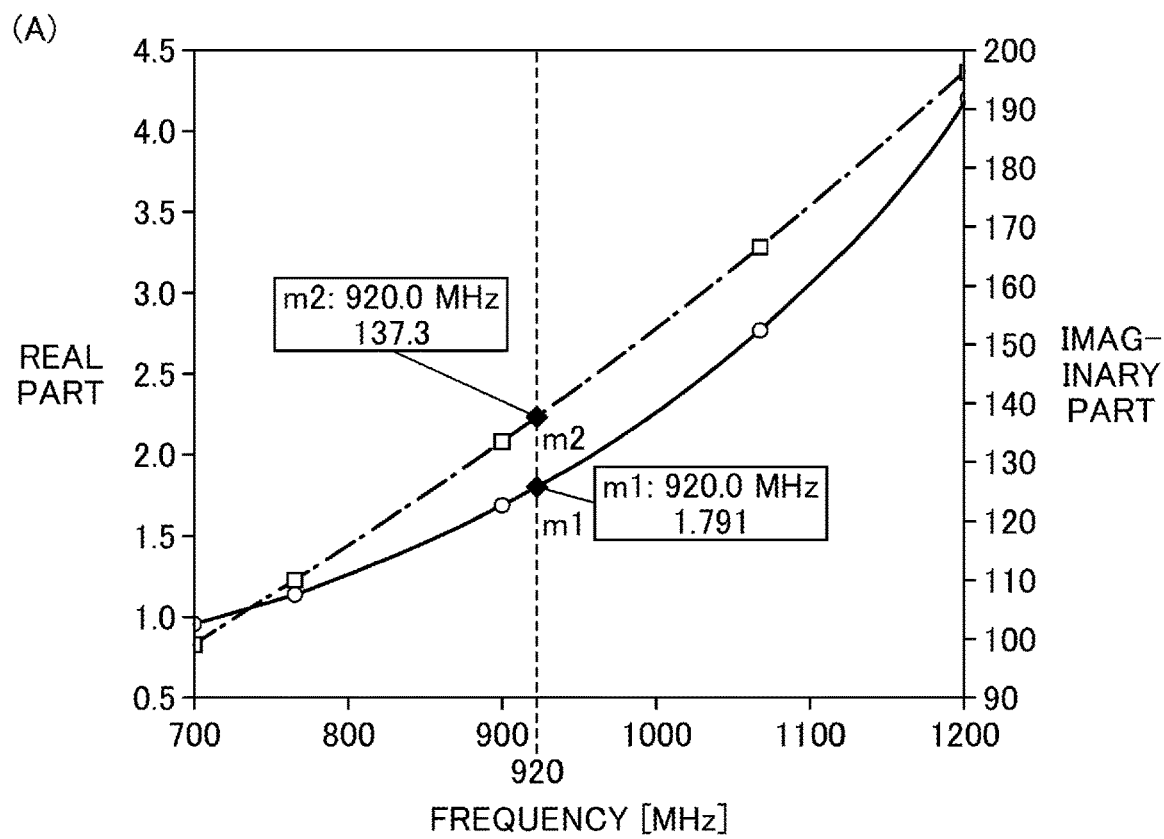
FIG. 18 is a diagram that illustrates an example of impedance characteristics of the antenna according to the sixth modification.
Figure 18:
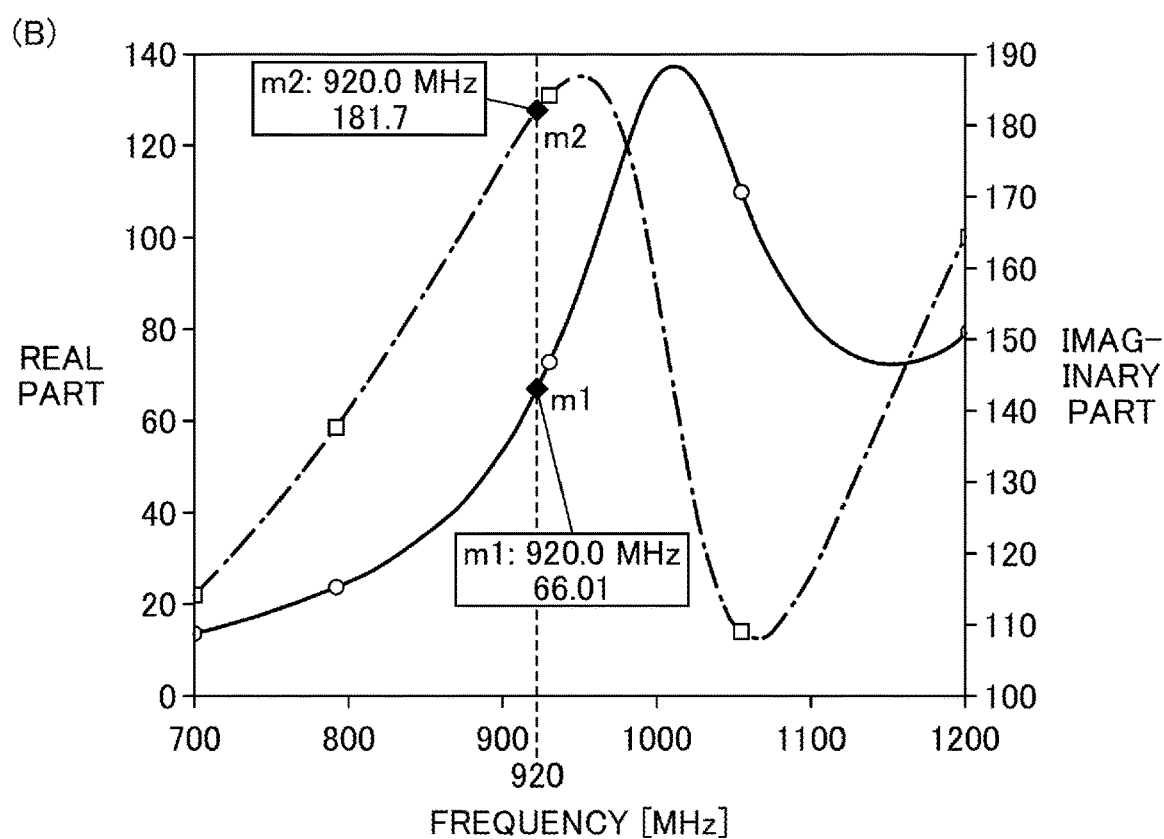

FIG. 18 is a diagram that illustrates an example of impedance characteristics of the antenna according to the sixth modification. FIG. 18(A) shows a simulation result of impedance characteristics of the antenna 1700 when the blood collection tube 10 holds no liquid. Also, FIG. 18(B) shows a simulation result of impedance characteristics of the antenna 1700 when the blood collection tube 10 holds liquid (water).

The example of FIG. 18(A) shows that, at 920 MHz, which is the frequency the RFID tag 100 uses for communication, the value of the real part R of the impedance Z of the antenna 1700 is approximately 1.79Ω, and the value of the imaginary part X is approximately 137.3Ω. The example of FIG. 18(B) shows that, at a frequency of 920 MHz, the value of the real part R of the impedance Z of the antenna 1700 is approximately 66.0Ω, and the value of the imaginary part X is approximately 181.7Ω.

Also, in FIG. 18(A), the frequency at which the value of the imaginary part X of the impedance Z of the antenna 1800 is around 213Ω is estimated to be 1200 MHz or higher.

Thus, the area of the opening 222 of the antenna 220 according to one embodiment shown in FIG. 3 is reduced, and the area of the opening 222 is reduced while maintaining a similar shape (similarity) to the shape of the letter T, so that the impedance characteristics of the antenna 220 can be changed more dynamically.

From the above, it is likely that, with the antenna 220 according to one embodiment shown in FIG. 3, the resonance frequency of the antenna 220 can be adjusted by varying the inner area of the T shape in the inner periphery 221.

Also, with the antenna 220, it is likely that the impedance of the antenna 220, in particular the impedance when the blood collection tube 10 holds liquid, can be adjusted by varying the T shape of the inner periphery 221.

<Evaluation Result of RFID Tag>

Next, an evaluation result of the reading characteristics of identification information (tag ID), observed when applying the RFID tag 100 having the antenna 220 according to one embodiment shown in FIG. 3 to the blood collection tube 10, will be described.

Figure 19:
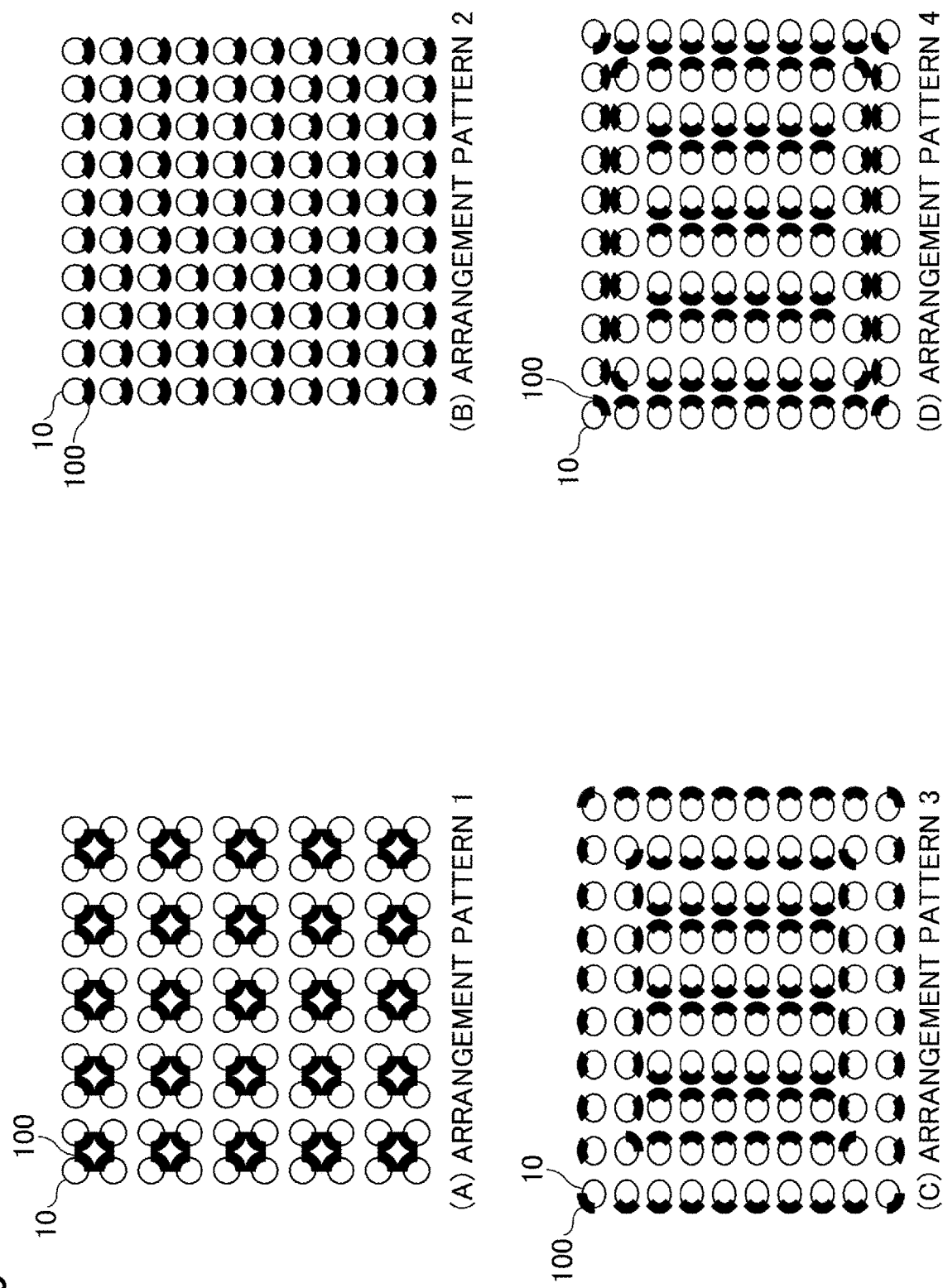
FIG. 19 is a diagram that illustrates an example arrangement pattern of blood collection tubes according to one embodiment.

FIG. 19 is a diagram that illustrates an example arrangement pattern of blood collection tubes according to one embodiment. Here, as shown in FIGS. 19(A) to (D), a total of 100 blood collection tubes 10 were arranged in 10 columns and 10 rows and set in a tag ID reader device, read 100 times, and evaluated by counting the number of times all of the 100 tag IDs were read successfully.

Note that, for the blood collection tubes 10, blood collection tubes 10 made of plastic (polyethylene terephthalate) were used. Also, the RFID tag 100 was applied to each blood collection tube 10 such that, as shown in FIG. 2, the plus X direction of the RFID tag 100 faces the cap 11, and the longitudinal direction of the blood collection tube 10 and the longitudinal direction of the RFID tag 100 were substantially parallel.

Here, shown in FIG. 19(A), an arrangement pattern, in which four blood collection tubes 10 are grouped as one set, and in which each blood collection tube 10 is arranged such that the RFID tag 100 faces the inner side of the four blood collection tubes 10, is called "arrangement pattern 1." Also, shown in FIG. 19(B), an arrangement pattern, in which the RFID tag 100 of each blood collection tube 10 is arranged to face one direction (for example, forward), is called "arrangement pattern 2." Furthermore, shown in FIG. 19(C), an arrangement pattern, in which the RFID tags 100 of the blood collection tubes 10 of the outermost row are arranged to face outward, and in which the other blood collection tubes 10 are arranged as shown in FIG. 19(C), is called "arrangement pattern 3." Also, shown in FIG. 19(D), an arrangement pattern, in which the RFID tags 100 of the blood collection tubes 10 of the outermost row are arranged to face inward, and in which the other blood collection tubes 10 are arranged as shown in FIG. 19(D), is called "arrangement pattern 4."

Figure 20:
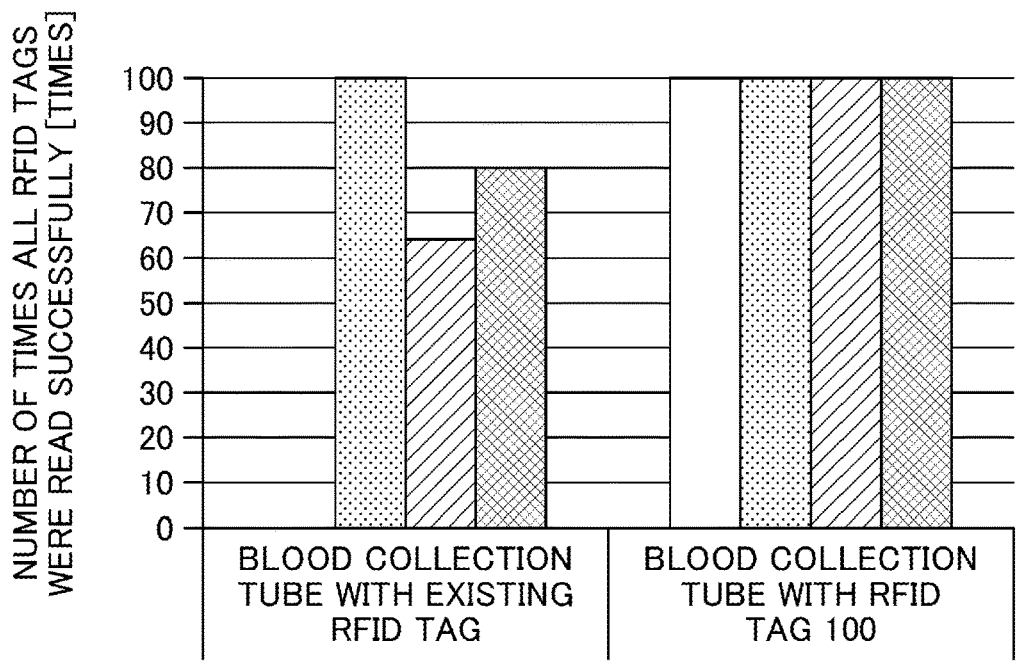
FIG. 20 is a diagram that illustrates an example of an RFID tag evaluation result according to one embodiment.
Figure 20:
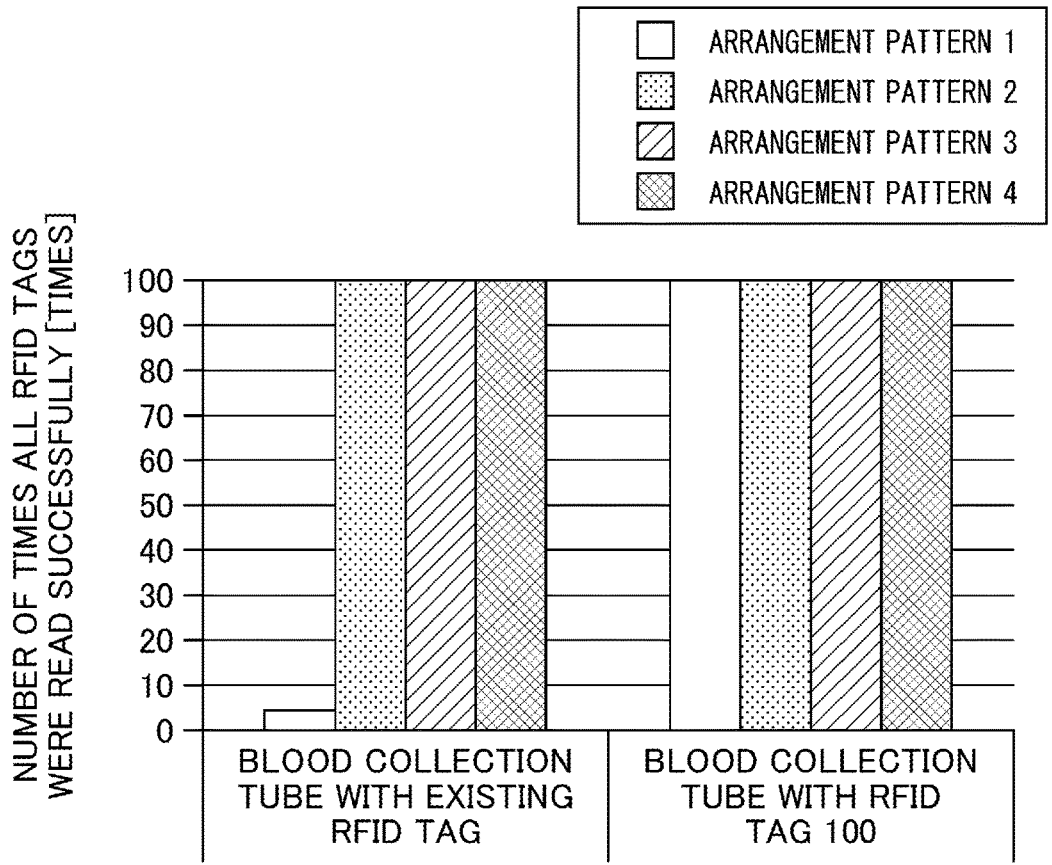

FIG. 20 is a diagram that illustrates an evaluation result of RFID tags according to one embodiment. As for the detail of evaluation, RFID tags 100 with the antenna 220 according to one embodiment shown in FIG. 3 were applied to blood collection tubes 10, and, the tag IDs were read by a reader device, 100 times, in each arrangement pattern of arrangement patterns 1 to 4. Note that the transmit/output power level of the reader device was 19 dBm.

Also, as a reference, the same reading was performed with blood collection tubes to which an existing RFID tag was applied.

FIG. 20(A) shows an evaluation result, in which the number of times all the tag IDs (100 tag IDs) were read successfully when the blood collection tubes 10 were empty (holding no liquid) and the tag IDs were read 100 times in each of arrangement patterns 1 to 4 was recorded.

As shown in FIG. 20(A), with the blood collection tubes 10, to which the RFID tag 100 according to the present embodiment was applied, all the tag IDs were read successfully, 100 times, in all of arrangement patterns 1 to 4. On the other hand, with the blood collection tubes to which an existing RFID tag was applied, reading failures occurred in arrangement patterns 1, 3, and 4, and, especially in arrangement pattern 1, the number of times all the tag IDs were read successfully was 0.

FIG. 20(B) shows an evaluation result, in which the number of times all the tag IDs (100 tag IDs) were read successfully when the blood collection tube 10 contained water (an example of liquid) and the tag IDs were read 100 times in each of arrangement patterns 1 to 4 was recorded.

As shown in FIG. 20(B), with the blood collection tubes 10, to which the RFID tag 100 according to the present embodiment was applied, all the tag IDs were read successfully, 100 times, in all of arrangement patterns 1 to 4. On the other hand, with the blood collection tubes to which existing RFID tags were applied, all the tag IDs were read successfully, 100 times, in arrangement patterns 2 to 4, but in arrangement pattern 1, all the tag IDs (100 tag IDs) were read successfully only four times.

As described above, according to the present embodiment, the RFID 100 tag applied to a container holding liquid such as the blood collection tube 10 can achieve a good communication distance regardless of the presence or absence of liquid.

Also, the antenna 220 included in the RFID tag 100 according to the present embodiment can change the resonance frequency of the antenna 220 by changing the area of the opening, without changing the outer shape, and therefore is suitable for small containers with limitations on their outer shape.

Furthermore, the antenna 220 according to the present embodiment can, for example, change the shape of the opening (to a dissimilar shape) while maintaining the area of the opening 222 where no conductor is formed, thereby making it easy to adjust the impedance characteristics of the antenna 220 when liquid is held.

As described above, according to the embodiment of the present invention, it is possible to provide an RFID tag 100 that is applied to a container for holding liquid and that can achieve a good communication distance regardless of the presence or absence of liquid.

The structure shown in the above embodiment only illustrates an example of the present invention, and it is possible to combine the present invention with other known technologies, and furthermore, part of the structure can be omitted or changed without departing from the scope of the present invention.

This application is based on and claims priority to Japanese Patent Application No. 2020-197057, filed with Japan Patent Office on Nov. 27, 2020, the entire contents of which are incorporated herein by reference.

DESCRIPTION OF REFERENCE NUMERALS 10 blood collection tube (an example of a container)
100 RFID tag
210 IC chip
220 antenna
221 inner periphery of antenna
222 opening
223 first opening
224 second opening

The invention claimed is:
1. An RFID (radio frequency identification) tag adapted to be applied to a container for holding liquid, the RFID tag comprising:
   an IC (integrated circuit) chip on which identification information is recorded; and
   an antenna made of a loop-shaped conductor connected to the IC chip,
   wherein the antenna has a T-shaped opening in which the conductor is not formed,
   wherein an outer shape of the antenna forms a rectangle,
   wherein the IC chip is electrically connected to a central portion of one side of the rectangle, and
   wherein the T-shaped opening includes:
   a first opening extending in a direction parallel to the one side of the rectangle, and
   a second opening connected to a central part of the first opening, extending in a direction orthogonal to the one side of the rectangle, and extending in a direction opposite to the one side.

2. The RFID tag according to claim 1, wherein a resonance frequency of the antenna is adjusted by varying an area of the T-shaped opening.

3. The RFID tag according to claim 1, wherein an impedance of the antenna is adjusted by varying a shape of the T-shaped opening.

4. The RFID tag according to claim 3, wherein an impedance of the antenna observed when the container holds liquid therein is adjusted by varying a shape of the T-shaped opening.

5. The RFID tag according to claim 1, wherein the RFID tag uses frequencies including a 920 MHz band, between 860 MHz and 960 MHz, for communication.

6. The RFID tag according to claim 1, wherein the container is a blood collection tube configured to hold blood.

7. A blood collection tube with the RFID tag according to claim 1 applied thereto.

8. An antenna for use for an RFID (radio frequency identification) tag adapted to be applied to a container for holding liquid,
   wherein the antenna is adapted to be connected to an IC (integrated circuit) chip;
   wherein the antenna is made of a loop-shaped conductor,
   wherein the loop-shaped conductor has a T-shaped opening in which the conductor is not formed,
   wherein an outer shape of the antenna forms a rectangle,
   wherein a central portion of one side of the rectangle is adapted to be electrically connected to the IC chip, and
   wherein the T-shaped opening includes:
   a first opening extending in a direction parallel to the one side of the rectangle, and
   a second opening connected to a central part of the first opening, extending in a direction orthogonal to the one side of the rectangle, and extending in a direction opposite to the one side.

* * * * *